US012491080B2

(12) United States Patent
Nilsson et al.

(10) Patent No.: US 12,491,080 B2
(45) Date of Patent: Dec. 9, 2025

(54) EXPANDABLE SPINAL CAGE

(71) Applicant: Dynamic Implants Inc., Winter Park, FL (US)

(72) Inventors: Carl Michael Nilsson, Moreland Hills, OH (US); Yehuda Leib Herschman, Boca Raton, FL (US); Byron Douglas Giddens, Winter Park, FL (US)

(73) Assignee: Dynamic Implants Inc., Winter Park, FL (US)

( * ) Notice: Subject to any disclaimer, the term of this patent is extended or adjusted under 35 U.S.C. 154(b) by 185 days.

(21) Appl. No.: 18/155,253

(22) Filed: Jan. 17, 2023

(65) Prior Publication Data
US 2024/0238098 A1 Jul. 18, 2024

(51) Int. Cl.
*A61F 2/44* (2006.01)
*A61F 2/30* (2006.01)

(52) U.S. Cl.
CPC .. *A61F 2/4455* (2013.01); *A61F 2002/30324* (2013.01); *A61F 2002/3054* (2013.01); *A61F 2002/30579* (2013.01); *A61F 2002/3082* (2013.01)

(58) Field of Classification Search
CPC .............................................. A61F 2/442–447
See application file for complete search history.

(56) References Cited

U.S. PATENT DOCUMENTS

| 6,129,763 | A | 10/2000 | Chauvin et al. |
| 7,217,293 | B2 | 5/2007 | Branch, Jr. |
| 7,678,148 | B2 * | 3/2010 | Peterman ............... A61F 2/4455 623/17.11 |
| 8,663,332 | B1 | 3/2014 | To et al. |
| 8,986,387 | B1 * | 3/2015 | To ........................... A61F 2/442 623/17.15 |
| 9,566,168 | B2 * | 2/2017 | Glerum .................. A61F 2/447 |
| 9,795,493 | B1 | 10/2017 | Bannigan |

(Continued)

FOREIGN PATENT DOCUMENTS

| WO | 2013173767 A1 | 11/2013 |
| WO | 2018078450 A1 | 5/2018 |

(Continued)

OTHER PUBLICATIONS

The International Search Report and The Written Opinion of the International Search Authority, or the Declaration from the related PCT Application No. PCT/US2024/011611, dated May 23, 2024, 12 pages.

*Primary Examiner* — Eduardo C Robert
*Assistant Examiner* — Steven J Cotroneo
(74) *Attorney, Agent, or Firm* — Tucker Ellis LLP; Michael G. Craig

(57) ABSTRACT

One or more techniques and/or systems are disclosed for an expandable spinal cage device used in a spinal fusion procedure. The device can comprise three major pieces that are combined to expand the device both laterally and vertically in the intervertebral gap. A first piece is a cage support body, and a second piece is a width expander body inserted into the first piece that laterally expands the first piece. A third piece is a vertical expander body inserted into the first or second piece that results in vertical expansion of first piece. In this way, the first piece can be expanded laterally up to two times, and vertically up to two times.

22 Claims, 23 Drawing Sheets

(56) References Cited

U.S. PATENT DOCUMENTS

| | | | |
|---|---|---|---|
| 9,883,953 B1 | 2/2018 | To et al. | |
| 9,913,727 B2 * | 3/2018 | Thommen | A61F 2/447 |
| 10,105,238 B2 * | 10/2018 | Koch | A61F 2/4611 |
| 10,149,773 B2 | 12/2018 | To et al. | |
| 11,357,640 B2 * | 6/2022 | Weiman | A61F 2/4611 |
| 11,717,415 B2 * | 8/2023 | To | A61F 2/4455 |
| | | | 623/17.16 |
| 11,963,881 B2 * | 4/2024 | Josse | A61F 2/4611 |
| 2002/0040243 A1 | 4/2002 | Attali et al. | |
| 2011/0035011 A1 * | 2/2011 | Cain | A61F 2/4611 |
| | | | 623/17.16 |
| 2011/0172774 A1 * | 7/2011 | Varela | A61F 2/447 |
| | | | 623/17.16 |
| 2011/0301712 A1 * | 12/2011 | Palmatier | A61F 2/4611 |
| | | | 623/17.16 |
| 2014/0039622 A1 * | 2/2014 | Glerum | A61F 2/447 |
| | | | 623/17.15 |
| 2015/0148908 A1 * | 5/2015 | Marino | A61F 2/442 |
| | | | 623/17.16 |
| 2019/0231548 A1 | 8/2019 | Ewer et al. | |
| 2019/0269521 A1 * | 9/2019 | Shoshtaev | A61F 2/447 |
| 2020/0229939 A1 * | 7/2020 | To | A61F 2/447 |

FOREIGN PATENT DOCUMENTS

| | | |
|---|---|---|
| WO | 2021058971 A1 | 4/2021 |
| WO | 2022192512 A1 | 9/2022 |

\* cited by examiner

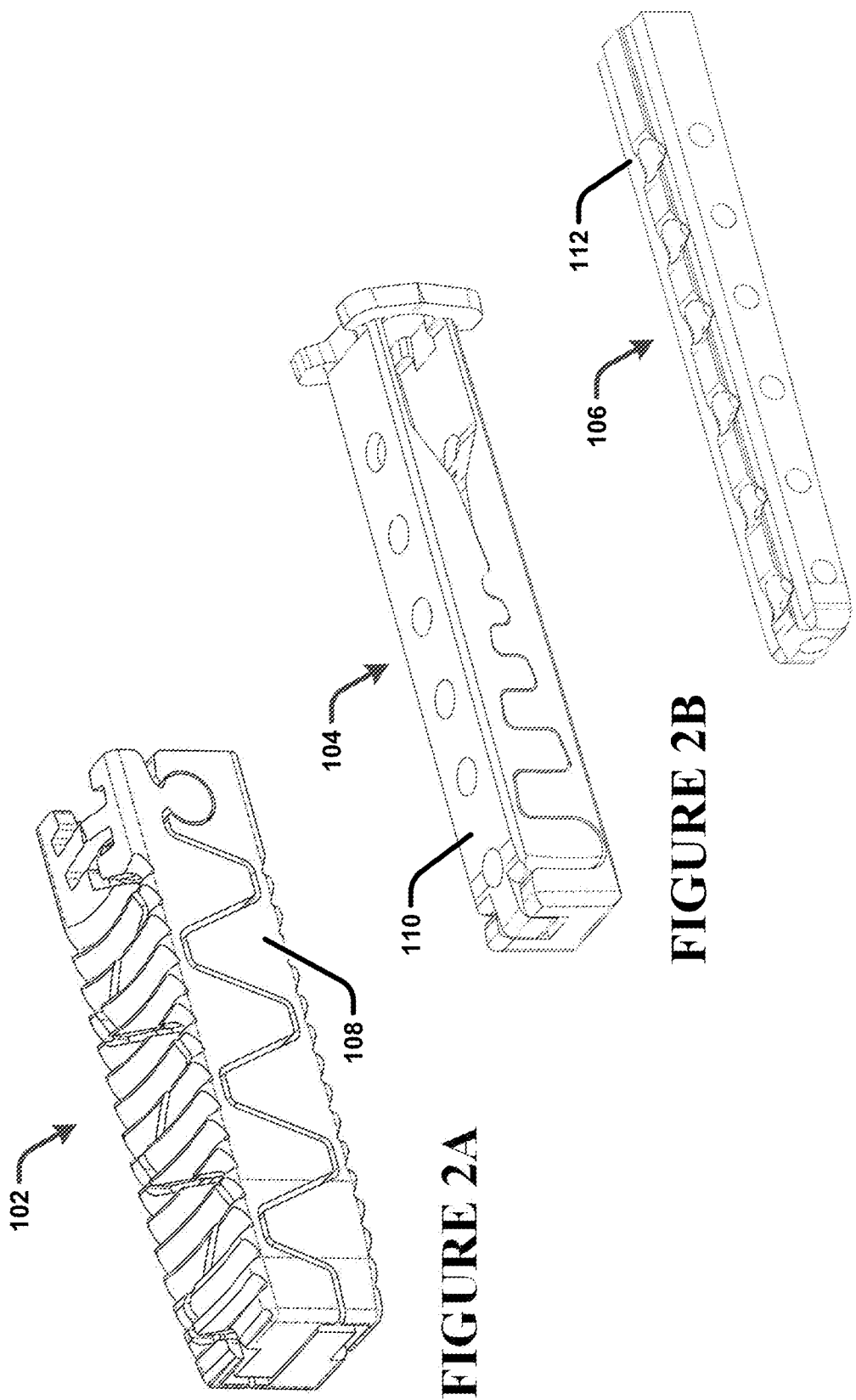

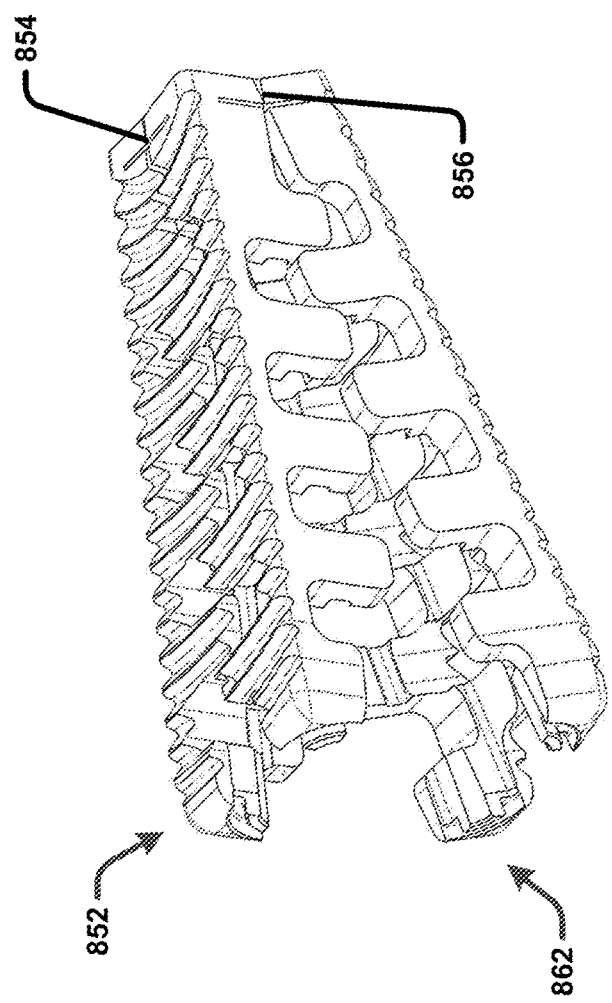
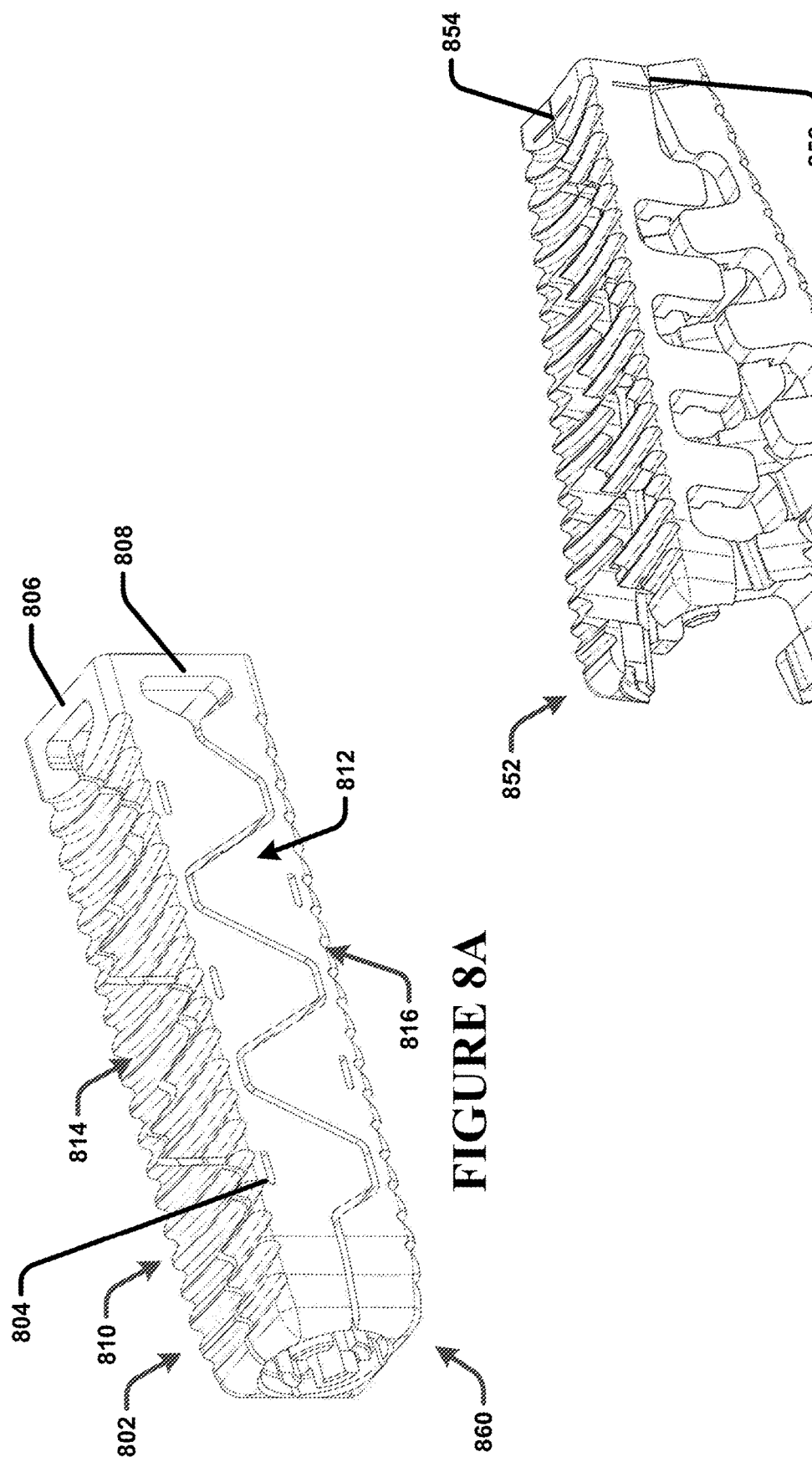
FIGURE 8A
FIGURE 8B

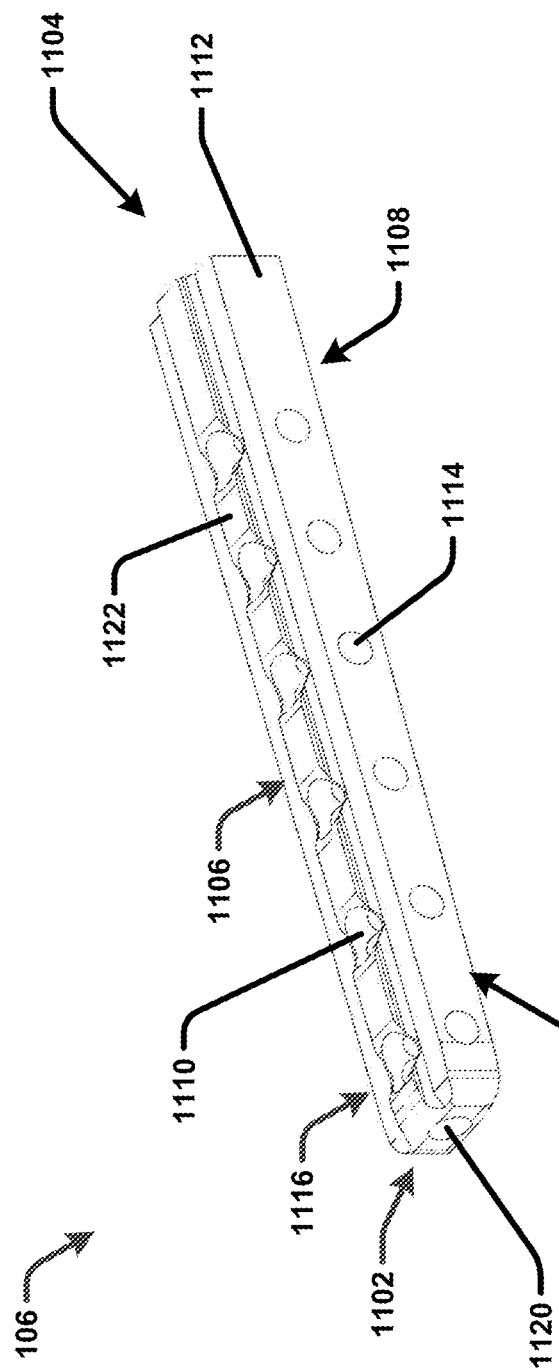
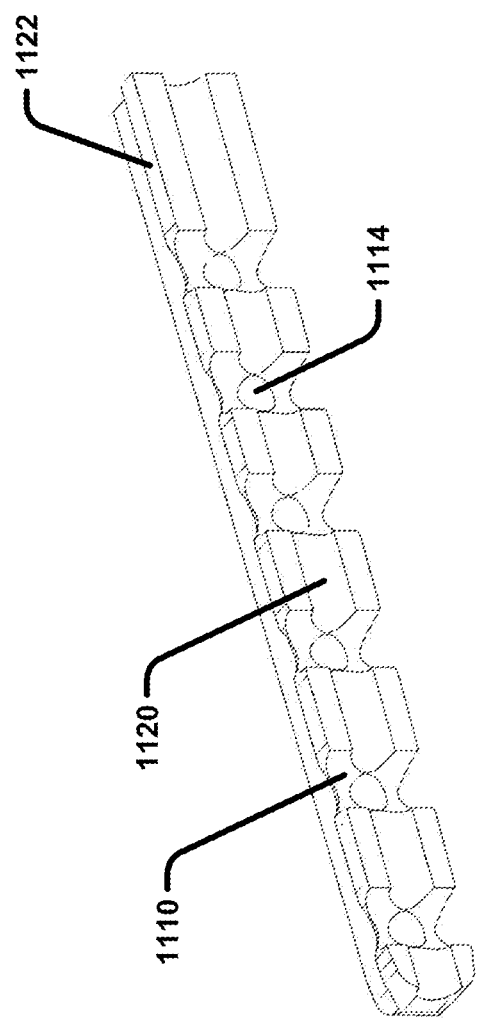
FIGURE 11A
FIGURE 11B

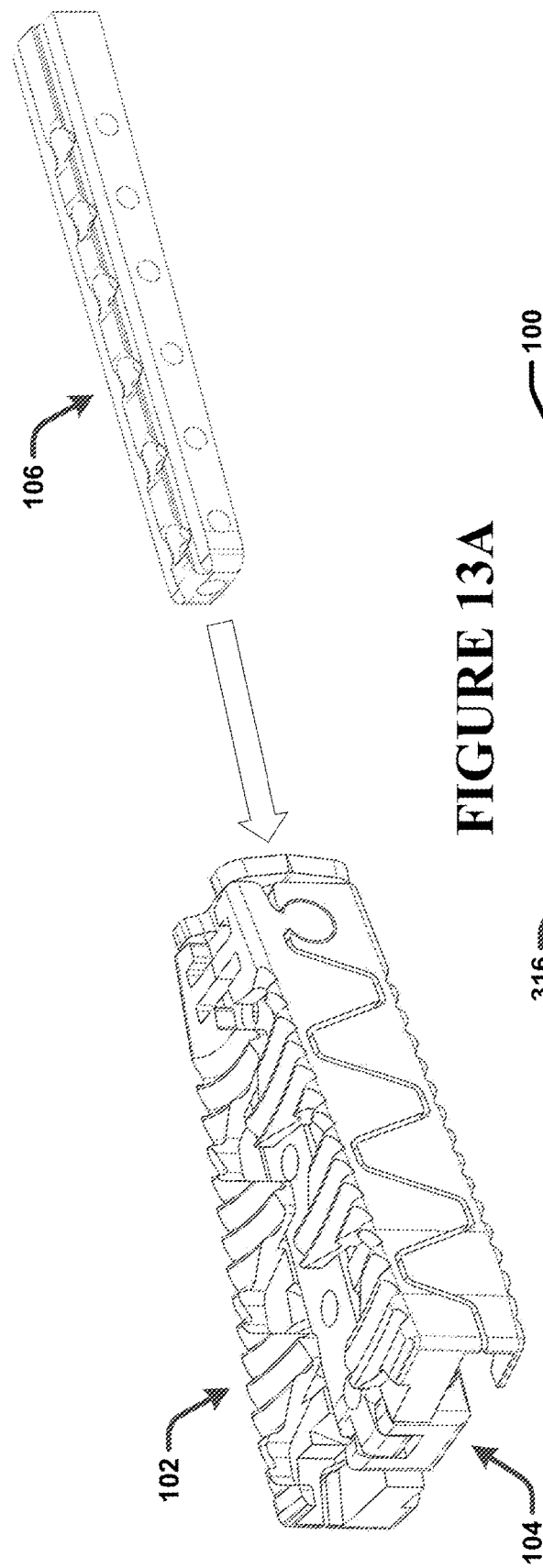
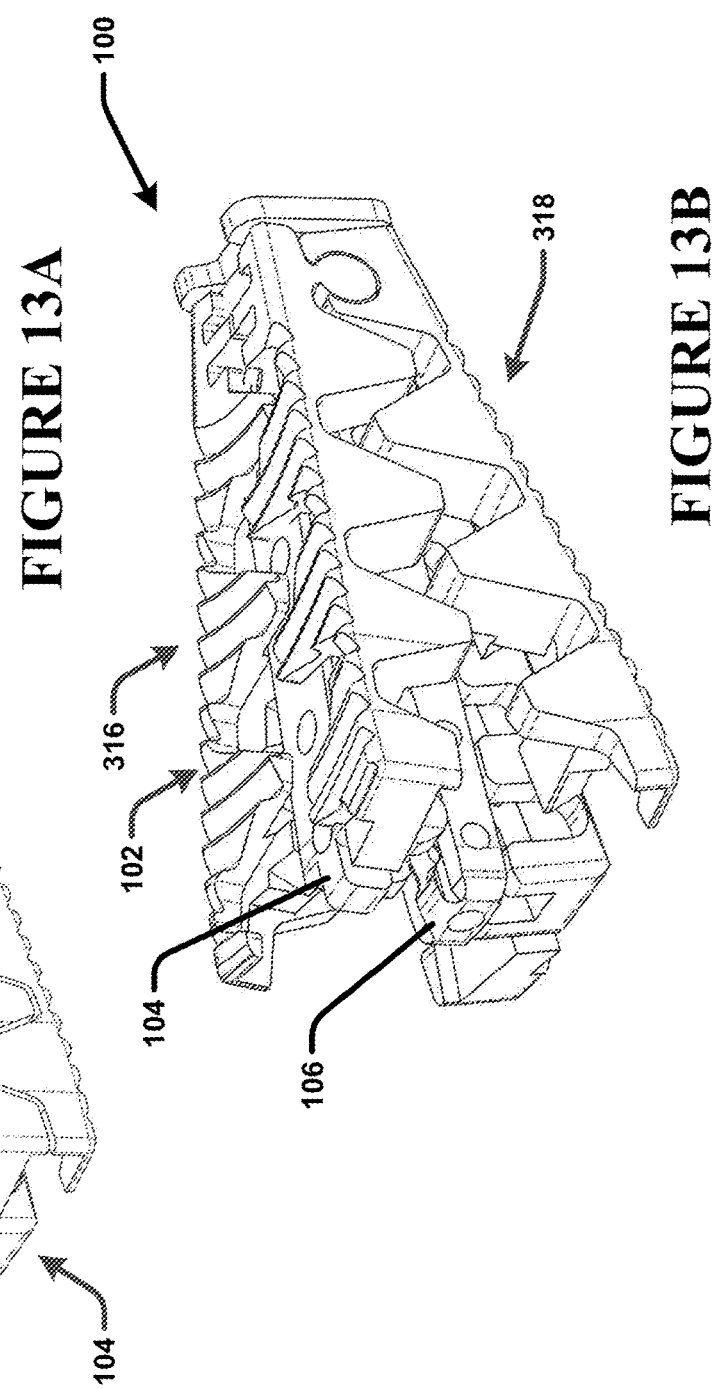
FIGURE 13A
FIGURE 13B

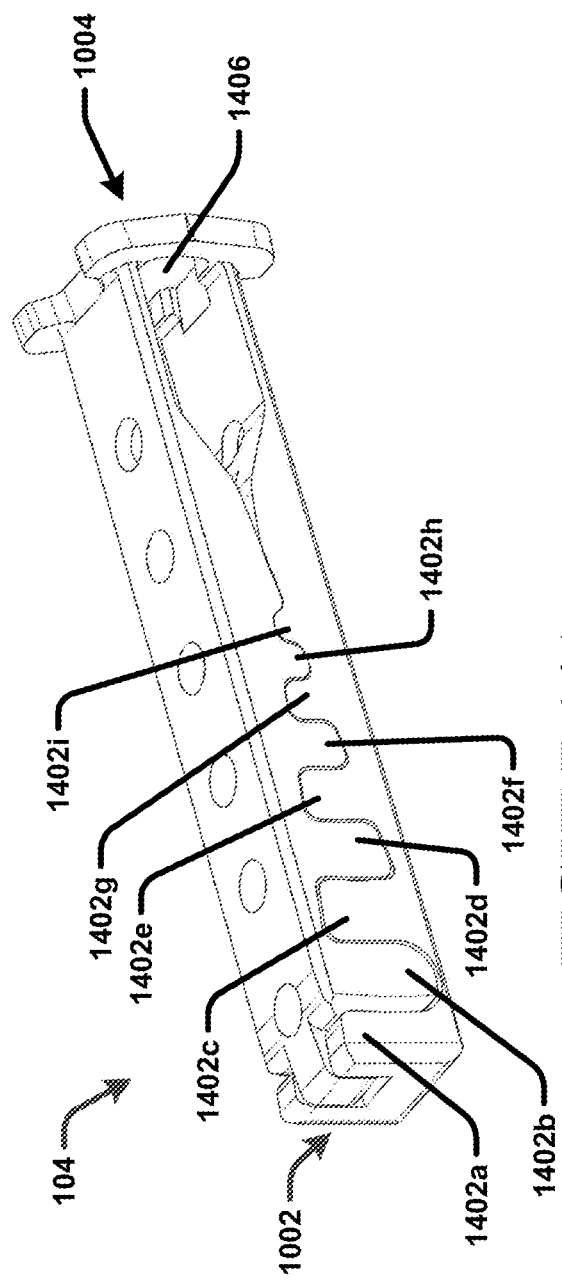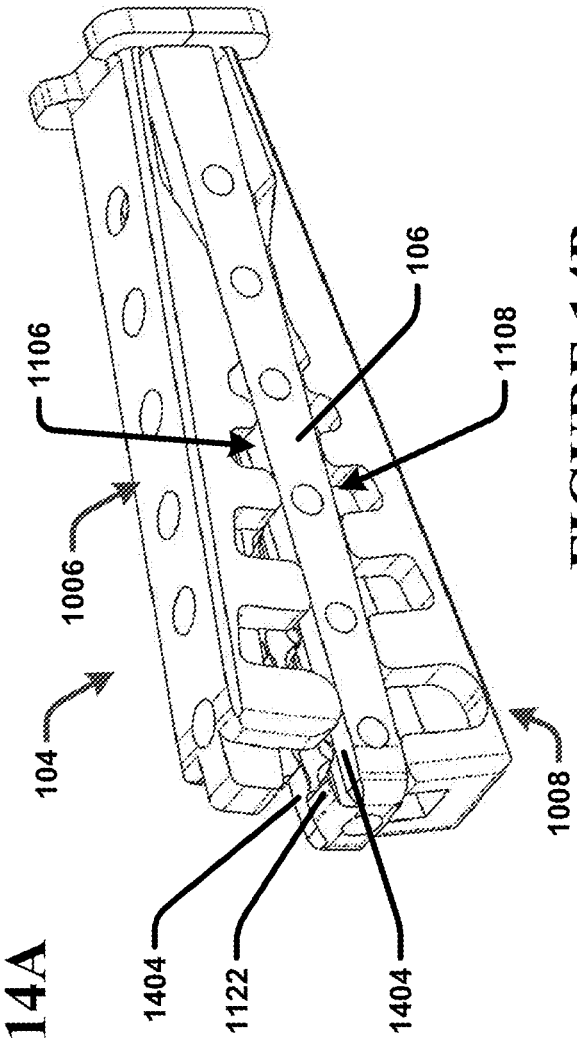
FIGURE 14A
FIGURE 14B

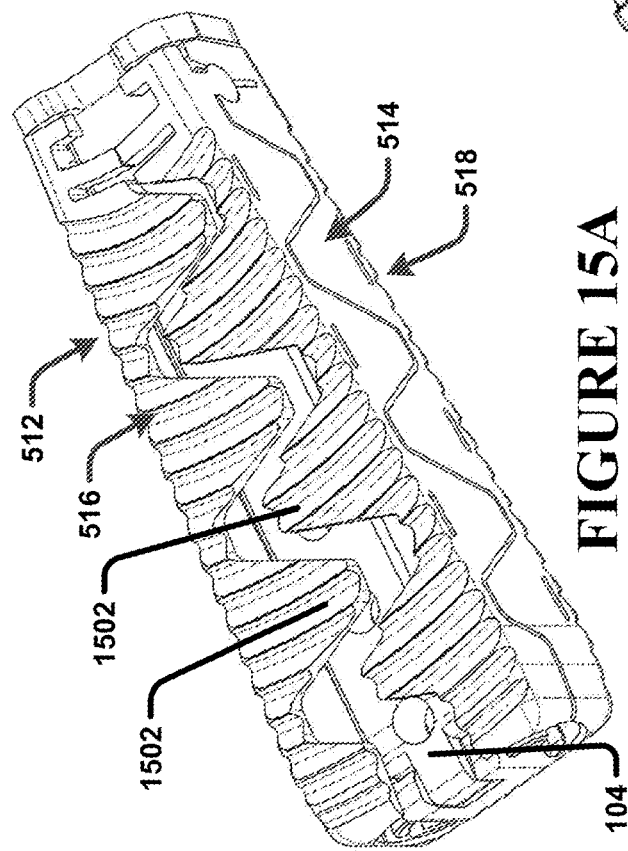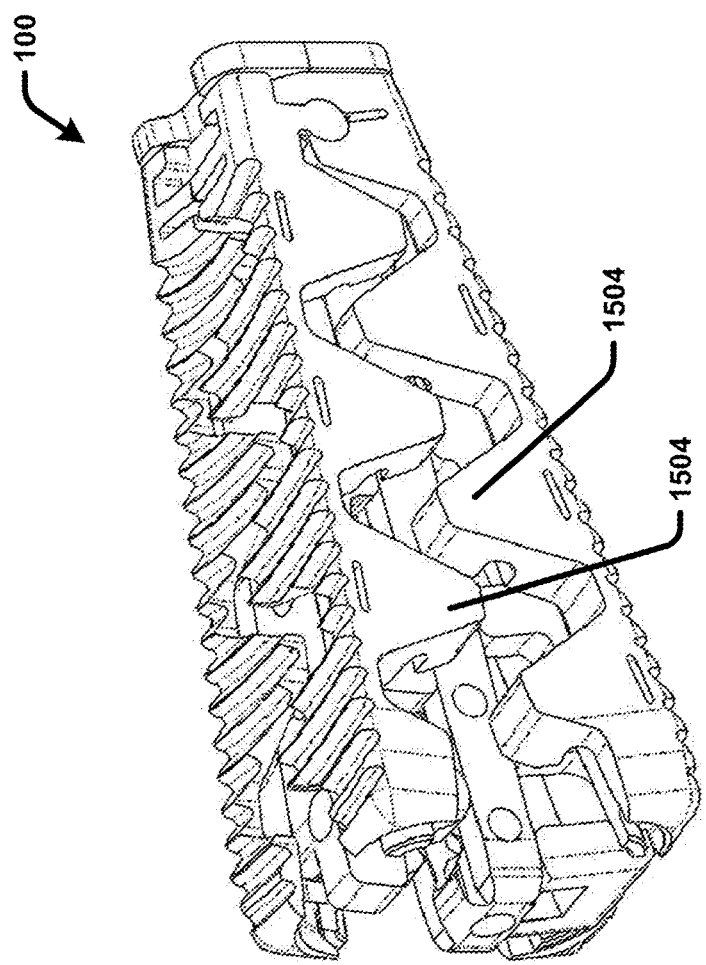
FIGURE 15A
FIGURE 15B

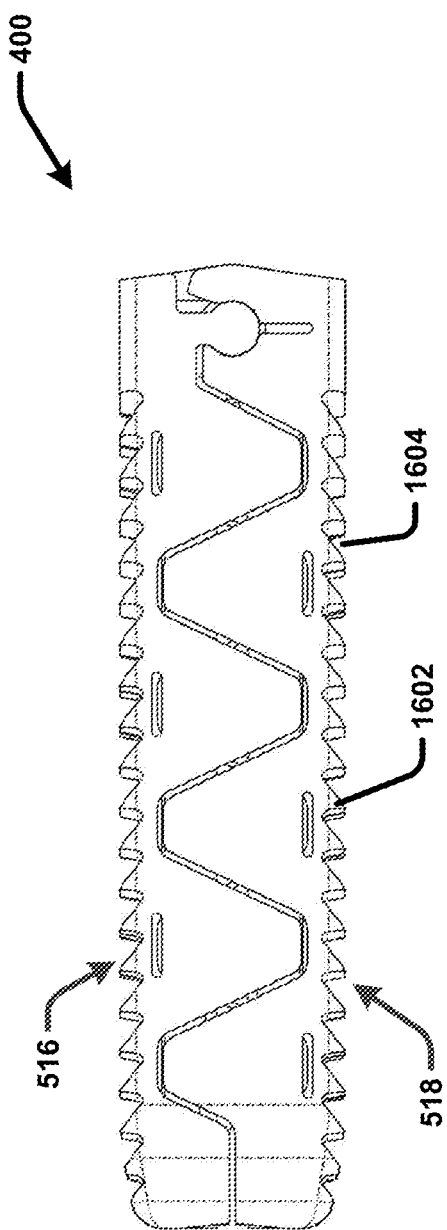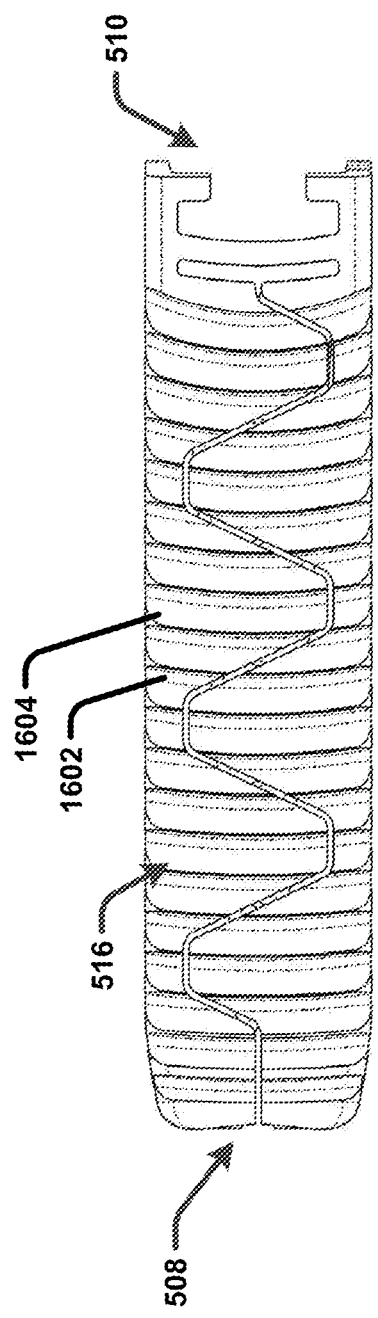
FIGURE 16A
FIGURE 16B

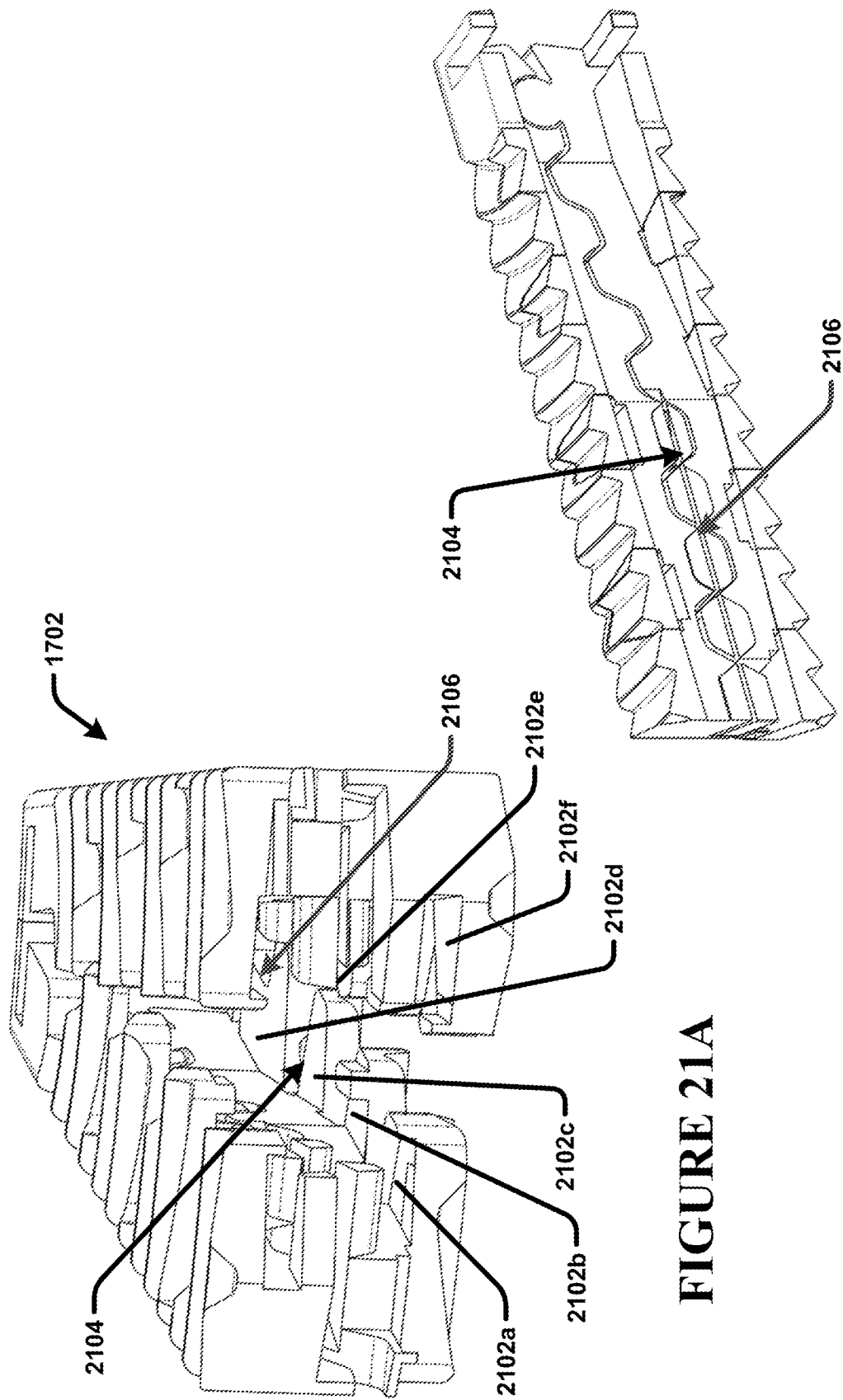

EXPANDABLE SPINAL CAGE

BACKGROUND

Spinal fusion is a surgery performed to permanently connect two or more vertebrae in a spine, which helps mitigate motion between them. To perform spinal fusion bone or a bonelike material can be placed within the space between two spinal vertebrae. In some instances, a spinal fusion cage made of compatible material can be placed in the intervertebral space, and fusion cement material can be introduced with or without bone material, to heal into a fused unit. Additionally, in some situations, metal plates, screws and rods may be used to hold the vertebrae together, so they can heal into one solid unit.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for an expandable spinal cage that can be used in a spinal fusion procedure. The device can be comprised of three major pieces (which may each be formed of one or more segments), which are combined to expand the device both laterally and vertically in the intervertebral gap. A first piece forms a structural cage that can expand both laterally and vertically, and can be inserted into spinal gap. A second piece is shaped such that when it is inserted into the first piece, in the spinal gap, the first piece expands laterally up to twice its initial horizontal width. A third piece is inserted into the second piece, and is shaped such that when it is inserted the first and second piece expand vertically up to twice its initial height. In this way, the size of the initial insertion, of the first piece, can be minimized while the expanded size is substantially larger. The vertical expansion also includes the creation of a large lordotic angle within the device itself.

In one implementation of an expandable spinal cage device, a first piece comprises a cage support body. In this implementation, a second piece comprises a width expander body that is configured and sized to be inserted into the first piece, resulting in lateral expansion of the first piece from a first width to a second width. Further, a third piece comprise a vertical expander body that is configured and sized to be inserted into the second piece, resulting in vertical expansion of the first piece from a first height to a second height. In this implementation, the second width is up to twice the first width, and the second height is up to twice the first height.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIGS. 2A, 2B, and 2C are component diagrams illustrating an example implementation of one or more portions of one or more devices described herein.

FIGS. 8A, and 8B are component diagrams illustrating an example implementation of one or more portions of one or more devices described herein.

FIGS. 11A, and 11B are component diagrams illustrating an example implementation of one or more portions of one or more devices described herein.

FIGS. 13A, and 13B are component diagrams illustrating an example implementation of one or more portions of one or more devices described herein.

FIGS. 14A, 14B, 14C and 14D are component diagrams illustrating an example implementation of one or more portions of one or more devices described herein.

FIGS. 15A, and 15B are component diagrams illustrating an example implementation of one or more portions of one or more devices described herein.

FIGS. 16A, and 16B are component diagrams illustrating an example implementation of one or more portions of one or more devices described herein.

FIGS. 21A, 21B, and 21C are component diagrams illustrating an example implementation of one or more portions of one or more devices described herein.

DETAILED DESCRIPTION

Figure 1:
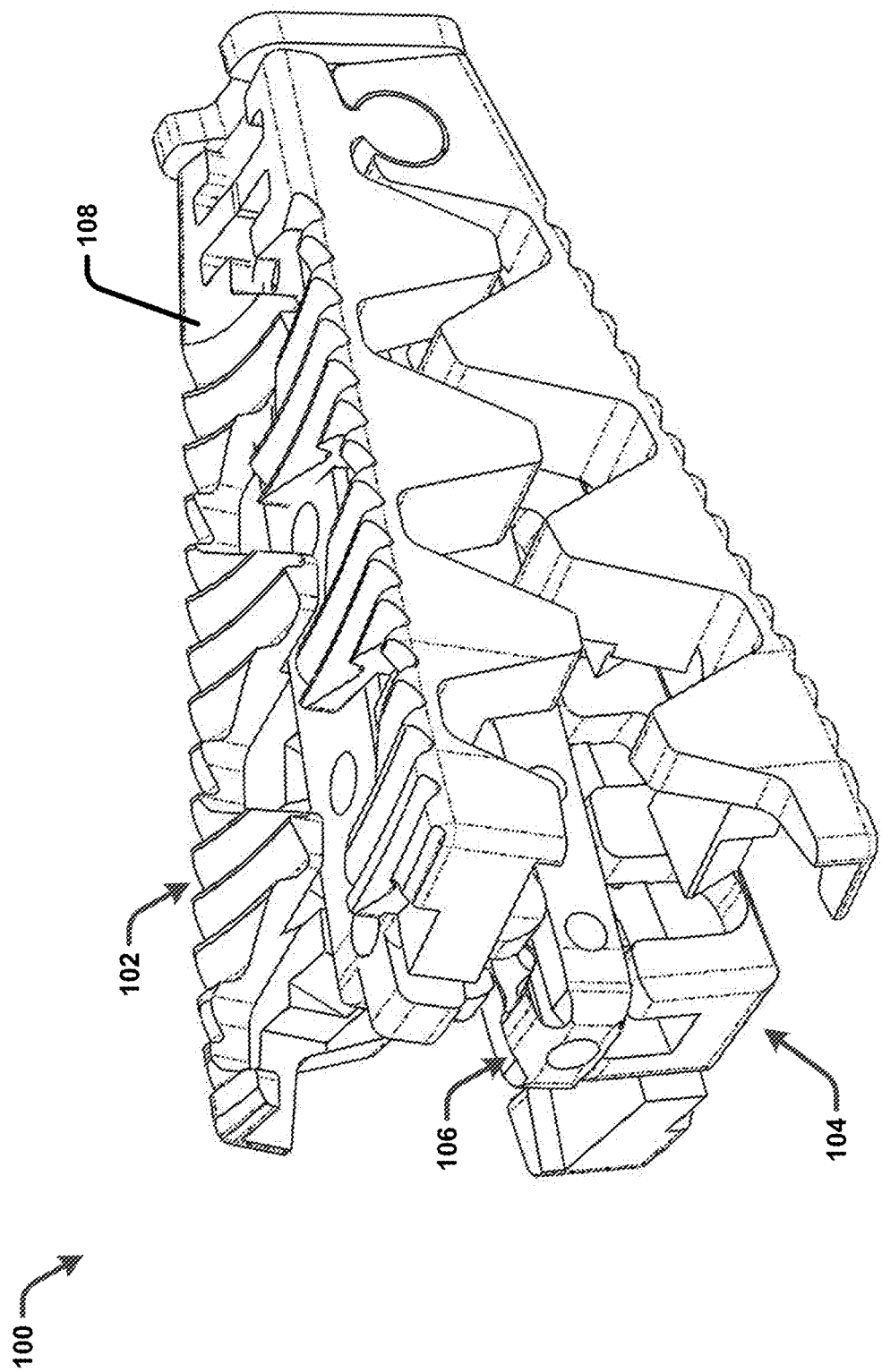
FIG. 1 is a component diagram illustrating one example implementation of an expandable spinal cage.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, an expandable cage device can be devised for use in a spinal stabilization procedure, where the insertion size of the device is minimized while producing a much larger expanded size than currently available devices. In some implementations, in this aspect, a first piece can comprise a cage or support structure, which may be inserted between lumbar vertebrae for a spinal fusion procedure, for example. A second piece can comprise a width expander that is inserted into the first piece to expand a portion of the first piece in a lateral direction. In this implementation, a third piece can comprise a height expander that is inserted into the second piece to expand a portion of the second piece in a vertical direction and thereby achieve an expansion of the first piece in a vertical direction which is accompanied by the creation of a lordotic angle. In this way, in this aspect, the expanded cage creates a hyperlordodic expansion between the lumbar vertebrae, for example.

FIGS. 1, 2A, 2B, 2C, 3A, 3B, and 3C illustrate one or more portions of a first implementation of an exemplary expanding spinal cage device 100. In this implementation, the exemplary device 100 comprises a first piece 102 (a.k.a., spinal cage, support structure) comprising a cage support body 108 that is configured to expand from a first position 302, to a second position 304 (e.g., width or lateral expansion), to a third position 306 (e.g., height or vertical expansion). Further, the exemplary device 100 comprises a second piece 104 comprising a width expander body 110 that is configured and sized to be inserted into the first piece 102, resulting in expansion of the first piece 102 (e.g., horizontally or laterally) from the first position (e.g., first width) 302 to the second position 304 (e.g., second width). In this implementation, the exemplary device 100 comprises a third piece 106 comprising a vertical expander body 112 that is configured and sized to be inserted into the second piece 104, resulting in expansion of the second piece 104 vertically, which results in vertical expansion of the first piece 102 from the second position 304 (e.g., first height) to the third position 306 (e.g., second height). As an example, respective first, second and third pieces 102, 104, 106 can be made of any suitable material for use as a medical device, and supportive for spinal stabilization, such as metal (e.g., titanium, alloys, etc., such as Ti-6A1-4V—Grade 5), polymers (e.g., Poly-Ether-Ether-Keton (PEEK), and so on), etc.

As an example, in one implementation, the first position 302 of the first piece 102 can comprise the position and configuration (e.g., fully collapsed/closed) of the device 100 that is inserted into an intervertebral space during a spinal procedure. That is, in this example, the first position 302 represents a smallest size of a vertical and horizontal, cross-sectional area of the device 100, which allows for a small incision/insertion location during a procedure. In this example, a distal end 308 can be first inserted into the intervertebral space, such using an insertion tool (not shown) attached to a proximal end 310 of the device 100 (e.g., and/or at the distal end 308).

Figure 3B:
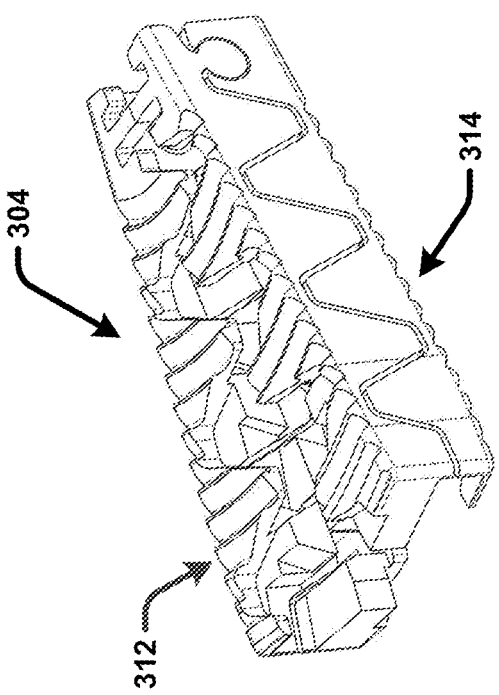
FIGS. 3A, 3B, and 3C are component diagrams illustrating an alternate example implementation of one or more portions of one or more devices described herein.
Figure 3A:
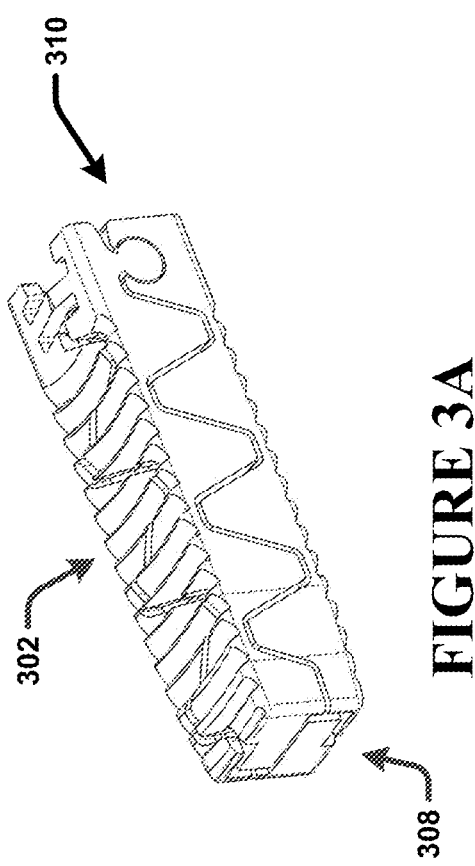
Figure 3C:
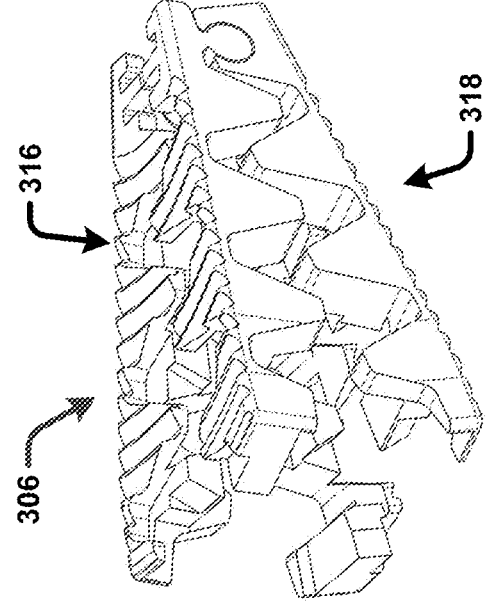
Figure 4:
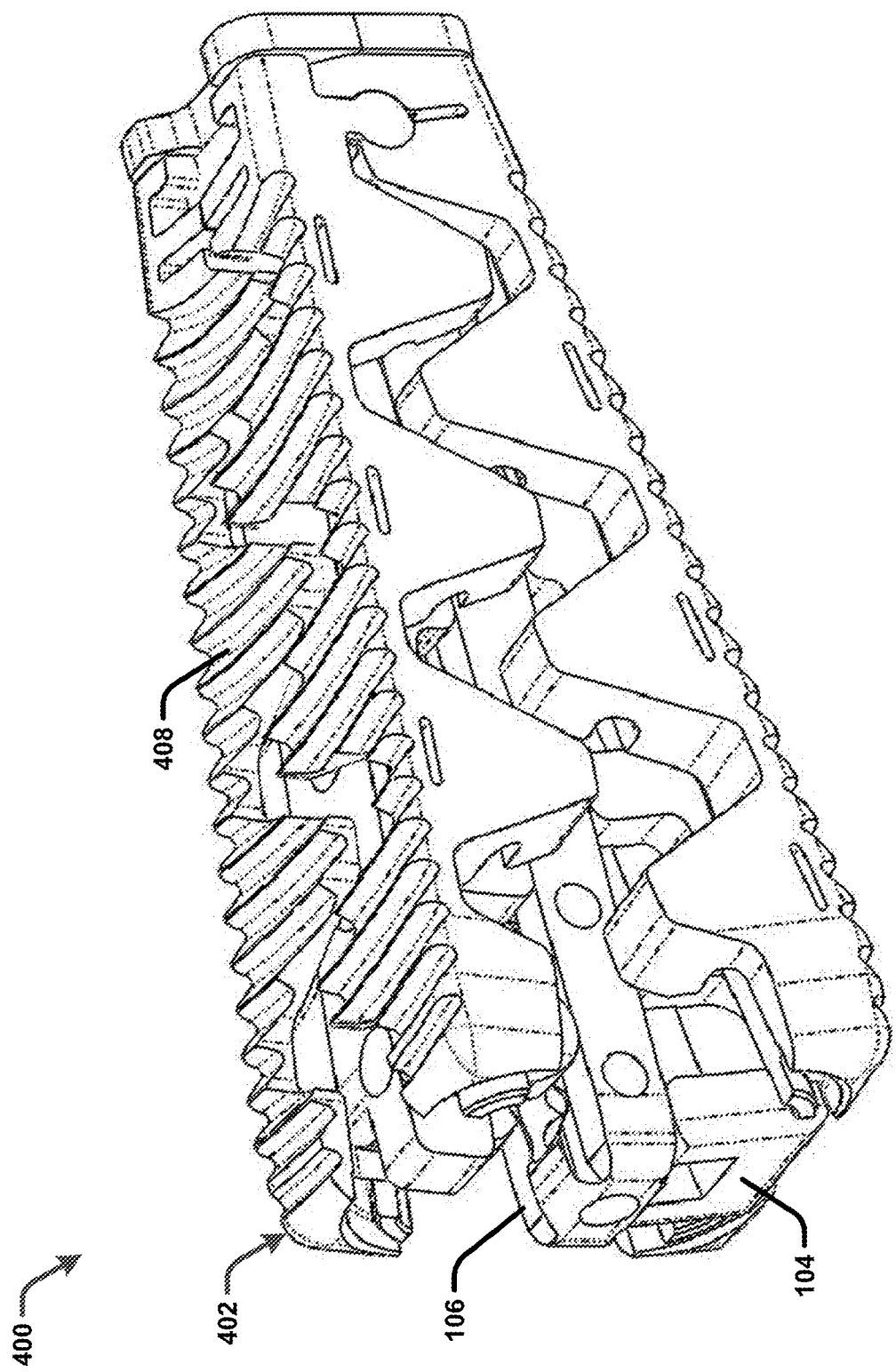
FIG. 4 is a component diagram illustrating one alternate example implementation of an expandable spinal cage.
Figure 5B:
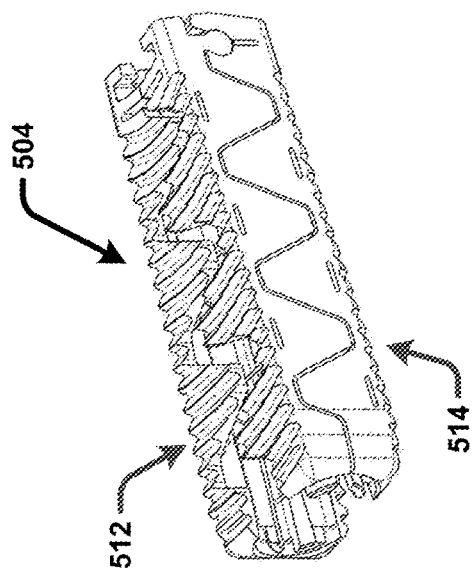
FIGS. 5A, 5B, and 5C are component diagrams illustrating an example implementation of one or more portions of one or more devices described herein.
Figure 5A:
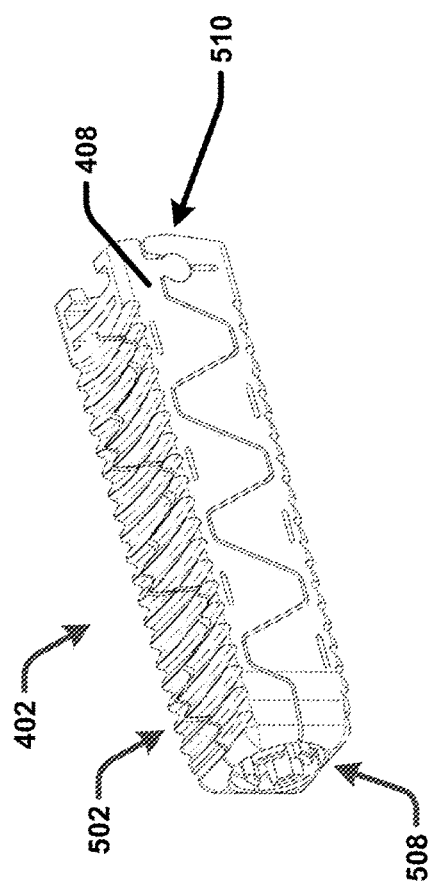
Figure 5C:
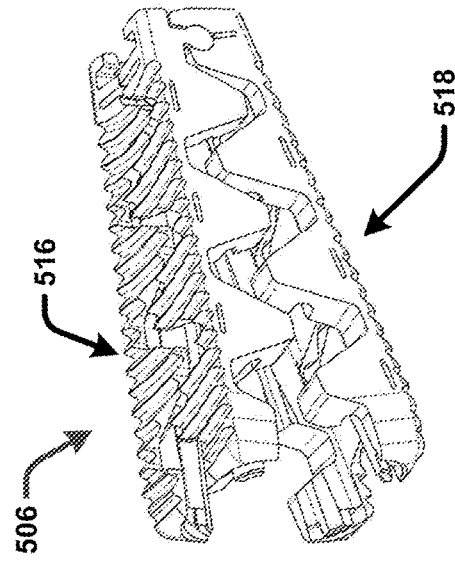

Further, in this implementation, FIG. 3B illustrates the second position 304, with a first vertical side 312 and a second vertical side 314 expanded laterally, after insertion of the second piece 104 (e.g., width expander). As an example, the laterally expanded second position 304 provides a wider base in the intervertebral space. For example, the width expansion can create a larger footprint on the lower and upper vertebral endplates in order to decrease subsidence into the endplate. FIG. 3C illustrates the third position 306, with a top side 316 and a bottom side 318 expanded vertically, after insertion of the third piece 106 (e.g., height expander). As an example, the vertically expanded third position 306 provides for a greater support and filling of the intervertebral space, such as for vertebral fusion procedures. For example, the height expansion can create an angled cage implant, which can match the anatomic lordotic angle between adjacent vertebral bodies.

FIGS. 4, 5A, 5B, and 5C illustrate an alternate implementation of an expandable cage device 400. In this implementation, a first piece 402 can comprise an alternate implementation of an expandable cage/support structure. Further, the second insertion piece 104 and third insertion piece 106 (e.g., from the example device 100) may be utilized in a similar manner as described above. That is, the first piece 402 can have a first position 502, where the cage 402 is disposed in a collapsed or closed position. As an example, in this first position 502 the device 400 can be inserted into an intervertebral space during a procedure, such as at a distal end 508, from a proximal end 510. In some implementations, an insertion tool (not shown) can be coupled at the distal end 508 (e.g., and/or at the proximal end 510), which also be used to hold the distal ends together during insertion. In a second position 504, a first side 512 and second side 514 have be expanded laterally (e.g., width) after insertion of the second piece 104, for example. In a third position 506, a top side 516 and a bottom side 518 have been expanded vertically, after insertion of the third piece 106.

Figure 6:
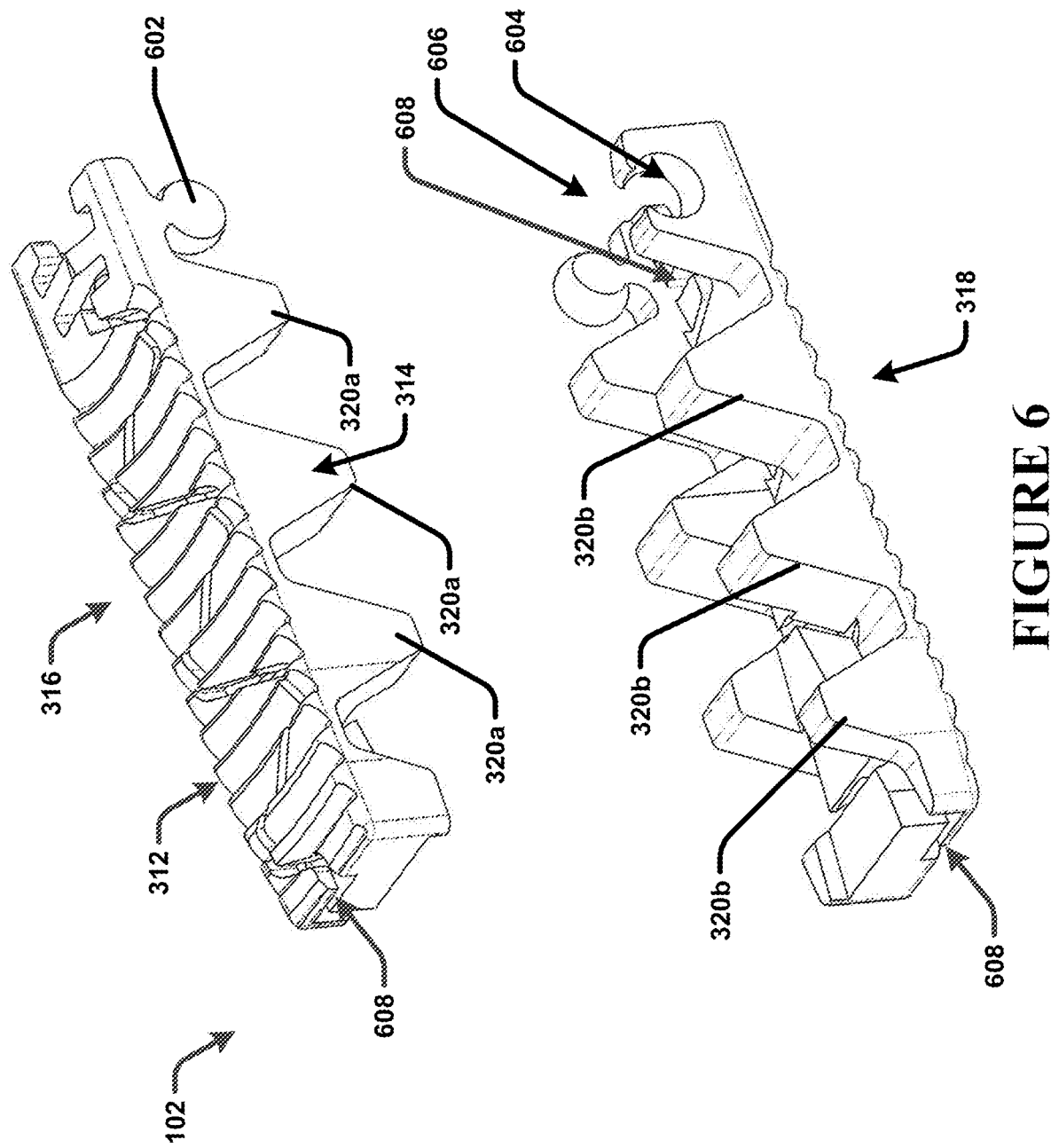
FIG. 6 is a component diagram illustrating an example implementation of one or more portions of one or more devices described herein.

FIG. 6 illustrates one implementation of the first piece 102 of the example device 100. In this example implementation, the top side 316 and bottom side 318 are illustrated separately. Further, in this example, the top and bottom sides 316, 318 can comprise identical parts, which may allow for efficiency in manufacturing. That is, for example, the parts (e.g., comprising the top and bottom sides 316, 318) that make up the first piece 106 can be formed (e.g., machined, milled, 3d-printed, forged, molded, etc.) in the closed position (e.g., with the first and second vertical sides 312, 314 closed, as in FIG. 3A). In this way, for example, there can be full access to machining/milling of interior geometry; and multiple horizontal undercuts can be performed as relief cuts to separate the first vertical side 312 from the second vertical side 314. Alternately, the parts (e.g., comprising the top and bottom sides 316, 318) that make up the first piece 106 can be formed in the open position (e.g., with the first and second vertical sides 312, 314 open, as in FIG. 3B). In this way, for example, there is greater access to machining/milling of interior geometry; and the horizontal undercuts may not be needed to separate the first side vertical 312 from the second side vertical 314. Additionally, in this example, a hinge 606 can comprise a ball 602 and socket 604 configuration. In this example, the ball 602 and socket 604 can have a complementary curved profile to allow for potential rotation for opening the top and bottom side 316, 318, and also allow for lateral rotation to provide for the opening of the first and second vertical sides 312, 314.

Further, the top side and bottom side 316, 318 of the first piece 102 can comprise vertically disposed interlocking teeth 320 along the first and second vertical sides 312, 314. The respective interlocking teeth 320 are of complementary heights such that the teeth 320 on the bottom section or side 318 are of similar heights as those on the top section or side 316 that interlock with each other when the first piece 102 is compressed. Additionally, as illustrated, the teeth 320a on the first vertical side 312 are disposed in an alternate arrangement, longitudinally, from the teeth 320b on the second vertical side 314. That is, the teeth 320a are disposed in a first vertical arrangement that is longitudinally offset from the teeth 320b disposed in a second vertical arrangement.

Figure 7:
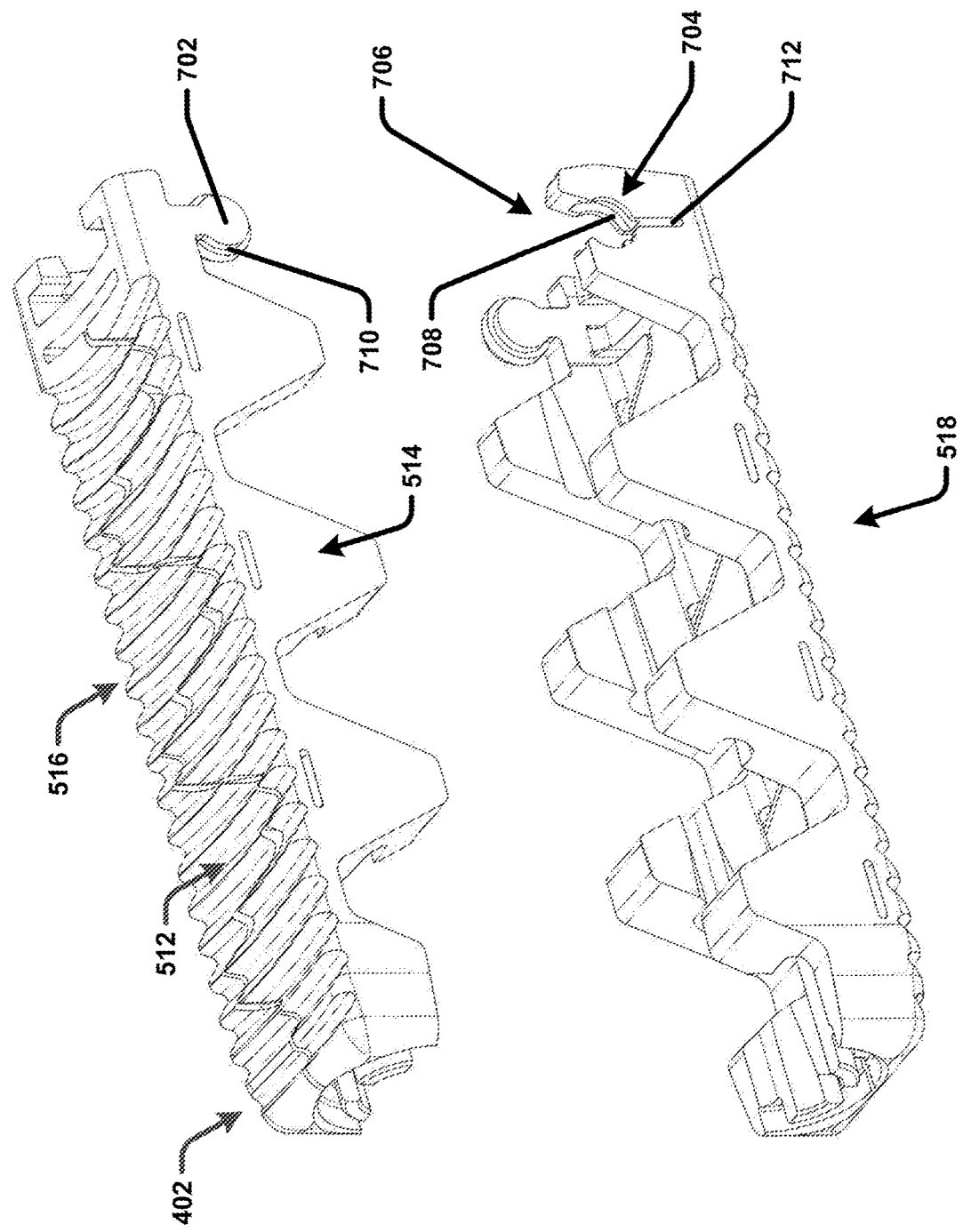
FIG. 7 is a component diagram illustrating an example implementation of one or more portions of one or more devices described herein.

FIG. 7 illustrates and alternate implementation of the first piece 402 of the second example device 400. In this example, a hinge 706 can comprise a ridged tooth 702 (e.g., circular shaped) and a complementary channel socket 704 design. In this implementation, the ridged tooth 702 comprises a ridge 710 that surrounds the tooth 702. Further, the channel socket 704 comprises a complementary channel 708 to receive the ridge 710 when coupled together. Additionally, small side slots 712 are disposed in the hinge 706 to allow for expansion of the channel socket 704 when the circular ridged tooth 702 is inserted (e.g., snapped into) the channeled socket 704.

FIGS. 8A and 8B illustrate other alternative of a first pieces 802, 852. In this example, the first piece 802, 852 can be formed as a single piece. For example, the piece 802 can be formed in the closed position 860 in FIG. 8A, or the first piece 852 can be formed in the open position 862 FIG. 8B (e.g., 802 can also be machined in an open position and 852 can be machined in a closed position). In this example, relief cuts 804 can be created during forming to provide for appropriate separation of the sides. In this example, the single first piece 802 formation has two bending zones 806, 808 (first and second), and the single first piece 852 formation has two bending zones 854, 856 (first and second). These bending zones can be deformed to allow for expansion of the first and second sides 810, 812, and the top and bottom sides 814, 816.

Figure 9B:
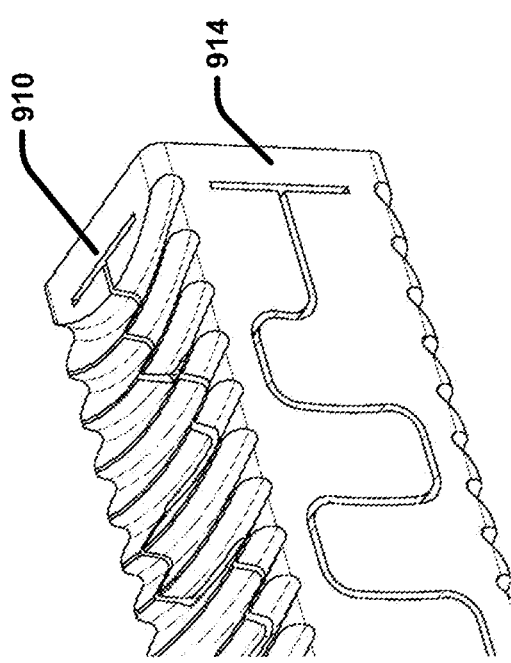
FIGS. 9A, 9B, 9C and 9D are component diagrams illustrating an example implementation of one or more portions of one or more devices described herein.
Figure 9D:
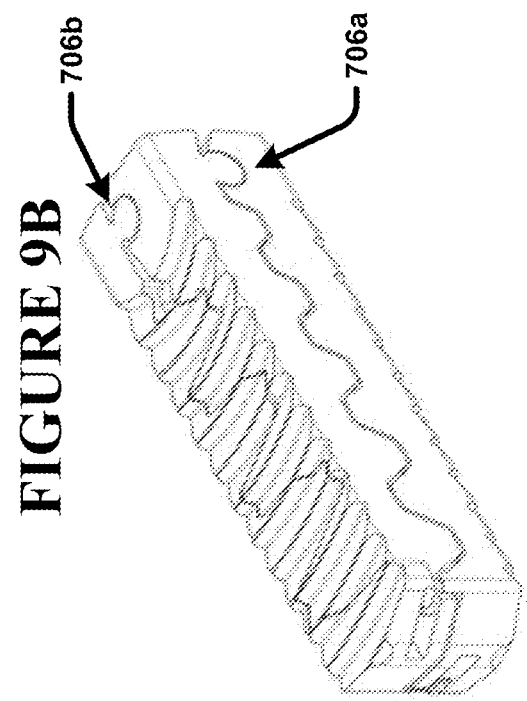
Figure 9A:
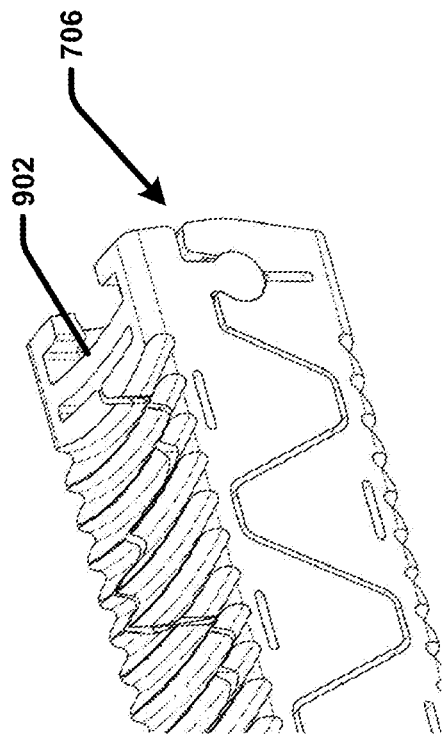
Figure 9C:
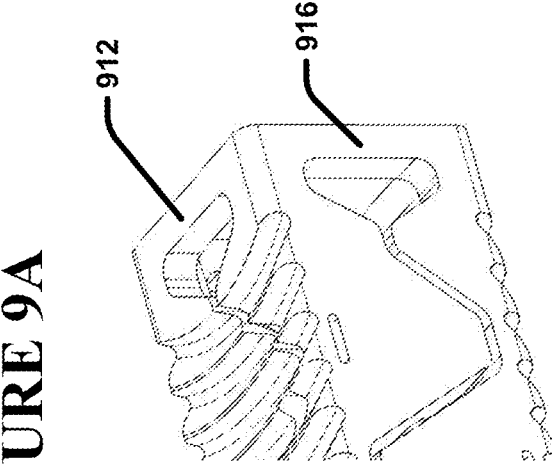

FIGS. 9A, 9B, 9C, and 9D illustrate various implementations of bending zones and hinges that provide for appropriate expansion of the expandable cage (first piece) of an example expanding cage device (e.g., 100, 400, etc.). In FIG. 9A, an example portion of the first piece (e.g., 402) comprises a hinge 706 (e.g., ball and socket) and a single bending zone 902. For example, this configuration can be used when two identical pieces are used to form the first piece. In another example, another ball-socket joint can be used instead of bending zone 902, whereby the first piece 402 would be assembled from four identical pieces, which can be seen in FIG. 9D. In FIGS. 9B and 9C, two alternate versions of a two-bend zone first piece are illustrated. In this example, such as when a single piece is formed for the first piece, a first bending zone 910, 912, and a second bending zone 914, 916 are used. As described above, this allows for appropriate expansion of the first piece both horizontally and vertically when the bending zones 910, 912, 914, 916 are appropriately deformed. As illustrated, the various bending zones can comprise any appropriate shape selected using engineering principles. In some implementations, as illustrated in FIG. 9D, the example first piece (e.g., 102, 402) can comprise a pair of hinges 706a, 706b of the ball and socket type, without the bending zones illustrated in FIGS. 9A-C.

Figure 10A:
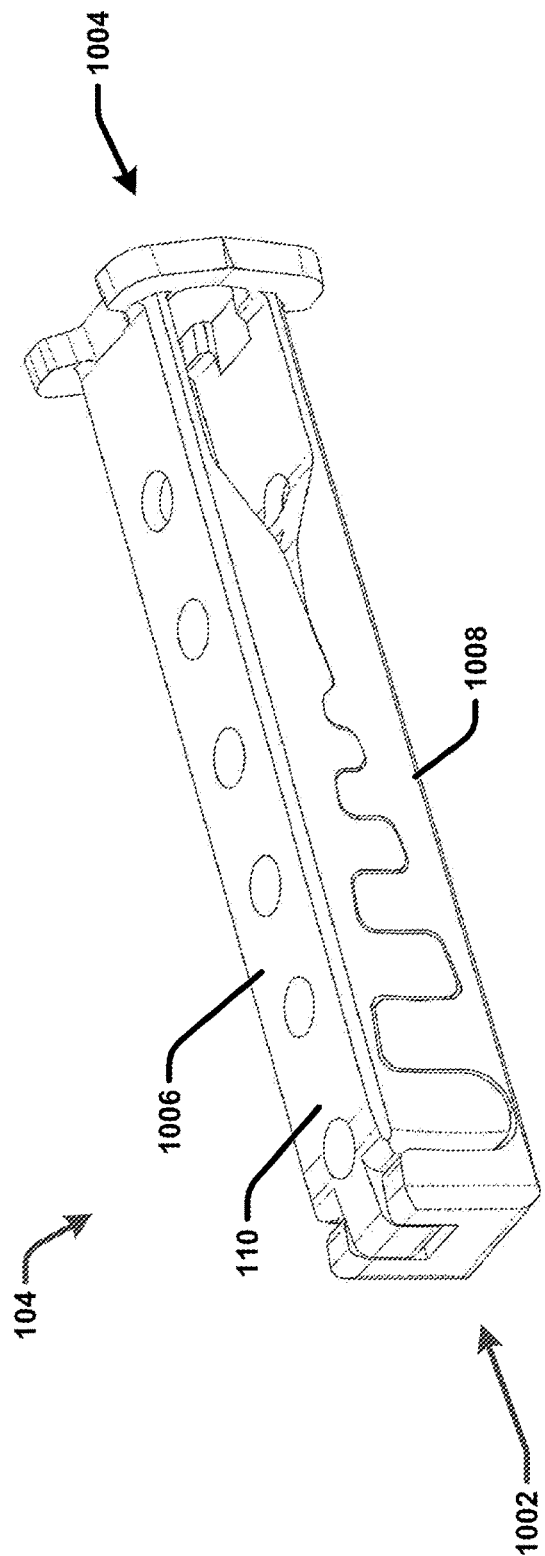
FIGS. 10A, and 10B are component diagrams illustrating an example implementation of one or more portions of one or more devices described herein.
Figure 10B:
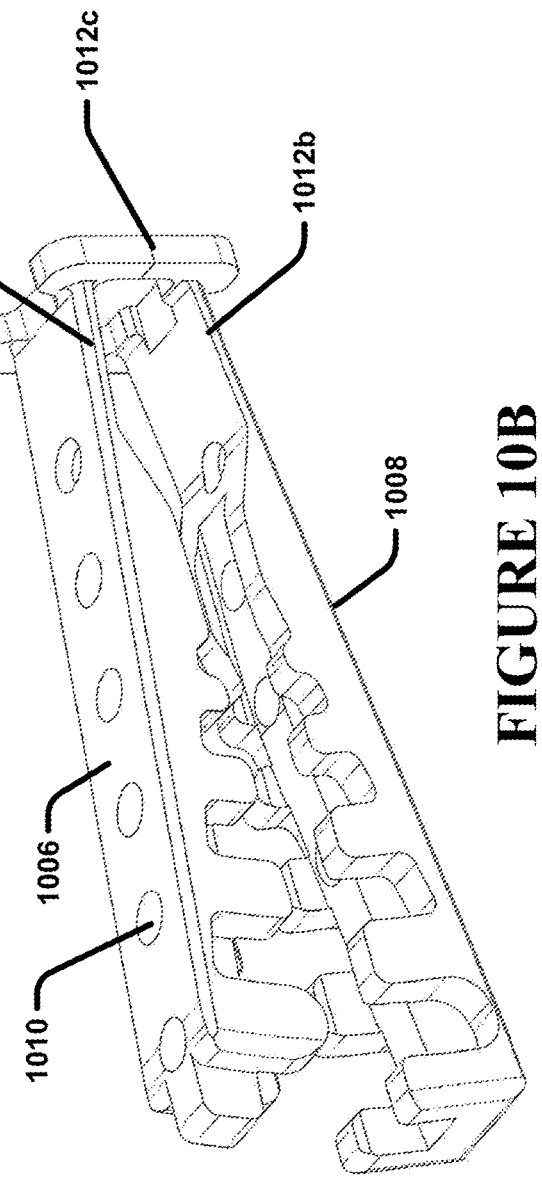

FIGS. 10A and 10B illustrate an implementation of the second piece 104 (a.k.a., width expander), shown in a first position FIG. 10A (e.g., closed or collapsed) and a second position FIG. 10B (e.g., open or expanded). As illustrated, the second piece 104 can operably be inserted into the proximal end 310, 510 of the first piece (e.g., 102 or 402) with the distal end 1002 of the second piece 104 while in the closed position. In the expanded position, in FIG. 10B, the top section or side 1006 and the bottom section or side 1008 separate vertically. As an example, the top side 1006 and bottom side 1008 can be parallel or non-parallel with respect to each other when expanded. Further, if not disposed parallel, as illustrated, a pre-defined lordotic angle can already be created by the expansion, along with the true lordotic angle creation with third piece (e.g., 106).

As illustrated, one or more vias 1010 (e.g., vertical holes) can be used to allow for the injection of bone cement or bone graft material to flow upward, for example. Additionally, the open side structure may allow for bone cement or bone graft to flow sideways. One or more bending zones 1012a, b, c may allow for appropriate opening and closing of the top side 1006 and bottom side 1008. Further, bending zone 1012c can comprise a hinged coupling (e.g., hinge) between the top side or section 1006 and the bottom side or section 1008. In this way, the top side 1006 separates from the bottom side 1008 in a hinged arrangement, as shown in FIG. 10B. As one example, the second piece 104 can be formed (e.g., machined, milled, molded, cast, printed, etc.) either in the closed position (FIG. 10A) or in the open position (FIG. 10B). The open position forming may allow for elastic spring back of the second piece to the open position after it is compressed into a closed position during initial insertion, for example.

FIGS. 11A and 11B illustrate an implementation of the third piece 106, in a perspective view and cut-away view, respectively. In this example, the third piece 106 (a.k.a., the height expander) comprise a static, non-deformable component having a distal end 1102 and a proximal end 1104. The distal end 1102 is configured to be inserted into the expansion cage device (e.g., 100, 400), such as by inserting into the proximal end 1004 of the second piece (e.g., 104). The example third piece comprises an upper surface 1106 and a lower surface 1108, and the upper and lower surfaces 1106, 1108 can be parallel or non-parallel. Further, one or more vertical vias 1110 (e.g., holes between the upper and lower surfaces 1106, 1108) can be disposed along the body 1112 of the third piece 106. One or more horizontal vias 1114 (e.g., holes between a first side 1116 and a second side 1118) can be disposed along the body 1112 of the third piece 106. Additionally, a central passage 1120 can be disposed along an axis of the body 1112 between the proximal 1104 and distal 1102 ends. In this implementation, the respective vias 1110, 1114, 1120 can be fluidly coupled to allow for the injection of bone cement or bone graft material throughout the cage, such as after expansion. In some implementations, the third piece 106 can comprise a central ridge 1122 that may interface with internal portions of the second piece 104 to facilitate centering of the third piece 106 inside the second piece 104. In some implementation, the third piece 106 can be configured in a keyed design to merely fit into the second piece 104 in one desired position.

Figures 12A, 12B, 12C, 12D:
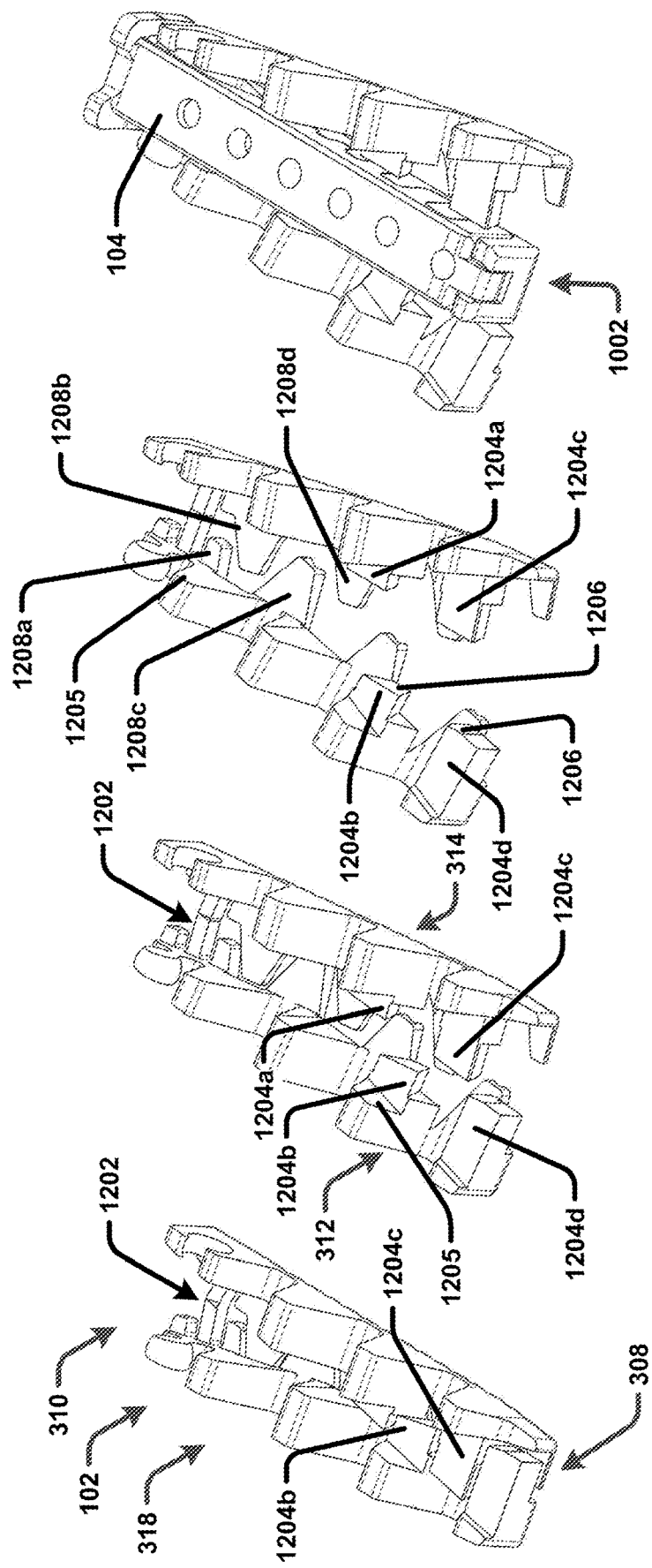
FIGS. 12A, 12B, 12C and 12D are component diagrams illustrating an example implementation of one or more portions of one or more devices described herein.

FIGS. 12A, 12B, 12C, and 12D illustrate a sequence of width expansion of the first piece 102 (e.g., or 402) of the example expandable cage device (100, 400). Merely a lower portion (e.g., bottom side 318, 518, 816) of the first piece 102 is illustrated for purposes of clarity. In FIG. 12A, the first piece 102 is disposed in the closed position (e.g., 302). In this implementation, each half of the first piece 102 can comprise interlacing or interlocking bottom teeth 1208 (1208a, 1208b, 1208c, 1208d)) and interlacing internal (e.g., or top) teeth 1204 that are disposed in a central cavity 1202. The central cavity 1202 is configured to operably receive the second piece 104. As illustrated, the interlacing bottom teeth 1208 and interlacing internal teeth 1204 are disposed in intervals on opposing sides of the central cavity, such that in the closed position (FIG. 12A) the respective teeth are disposed across the central cavity 1202, and interlaced with opposing teeth.

An opening at the proximal end 310 of the central cavity 1202 is configured and sized to receive the second piece 104. The central cavity 1202 can converge toward the distal end 308 in such a way, that when the second piece 104 is inserted into the central cavity 1202 the first and second vertical sides 312, 314 of the first piece 102 are pushed apart, as illustrated in FIG. 12B. In FIG. 12B, the first piece 102 is shown half expanded, though second piece 104 is not shown for better visualization. As illustrated, the interlacing bottom teeth 1208 and interlacing internal teeth 1204 are also shown as apart, which also illustrates the varying length of each interlacing bottom tooth 1208 and interlacing internal tooth 1204. That is, for example, the length of each interlacing tooth 1208 and/or 1204 can increase toward the distal end 308 (e.g., 1204d can be greater than 1204c, which can be greater than 1204b, which can be greater than 1204a; 1208a is smaller than 1208b, which is smaller than 1208c, which is smaller than 1208d; or each tooth may be of different, i.e., non-incremental lengths). While the illustrations show merely eight interlacing bottom teeth 1208 and four interlacing internal teeth 1204, it is contemplated that more or less teeth may be used to achieve similar results, depending on the size, shape, and application of the device 100. Further, an internal surface 1205 of the vertical side wall 312 and 314 and an inside surface 1206 of respective teeth 1204 can be configured to appropriately engage with the second piece 104, for example, such that the tooth face is substantially partially in contact with the sides of the second piece 104 when fully inserted. As an example, respective surfaces 1205, 1206 of the first piece 102, and/or surfaces of the second piece 104, may not be parallel or may not directly contact corresponding surfaces, such as when 104 is fully inserted. Further, various surfaces of the respective parts may be curved or flat, in various implementations. In this way, for example, the second piece 104 may be more easily inserted as each face 1205 and 1206 provides an angled face to the distal end 1002 of the second piece during insertion, at least until it is fully inserted.

FIGS. 12C and 12D illustrate the first piece 102 at a fully width expanded position (e.g., 304), with FIG. 12C showing the expansion without the second piece 104, and FIG. 12D showing the expansion with the second piece 104. As illustrated, the second piece 104 slides against the teeth faces 1205 and 1206, which pushes the vertical sides 312, 314 further apart (e.g., which may not normally be achieved without the interlacing expansion teeth 1204). As illustrated, amount of width expansion is enhanced due to interlacing expansion teeth 1204 protruding in the central cavity 1202. As one example, if the outside width of the unexpanded first piece 102 is 7 mm wide, and the outer width of the second piece 104 is 5 mm wide, then a width after insertion of second piece 104 can be: 7+5+7=19 mm, due to the interlacing width expansion teeth 1204.

FIGS. 13A and 13B illustrate one example of a sequence of height expansion. FIG. 13A shows the first and second pieces 102, 104 prior to height expansion (e.g., position 304), prior to insertion of the third piece. After the third piece 106 is inserted into the second piece 104, the second piece 104 opens vertically, which expands the height of the first piece 102 vertically, as shown in FIG. 13B. That is, the top side 316 and bottom side 318 are separated, creating a fully expanded device 100. FIGS. 14A and 14B illustrate the second piece 104 in a closed position, and height expansion of the second piece 104 after the third piece 106 is inserted, respectively. The second piece 104 comprises height interlacing expansion teeth 1402 (a-i). In this implementation, the height of the respective height expansion teeth 1402 increases from the proximal end 1004 to the distal end 1002 (e.g., from 1402i to 1402a). Further, in this implementation, each set of interlacing height expansion teeth 1402 (a-i) comprises a pair, one disposed on each side of the second piece 104 as shown in FIGS. 14A and 14B.

Figure 14C:
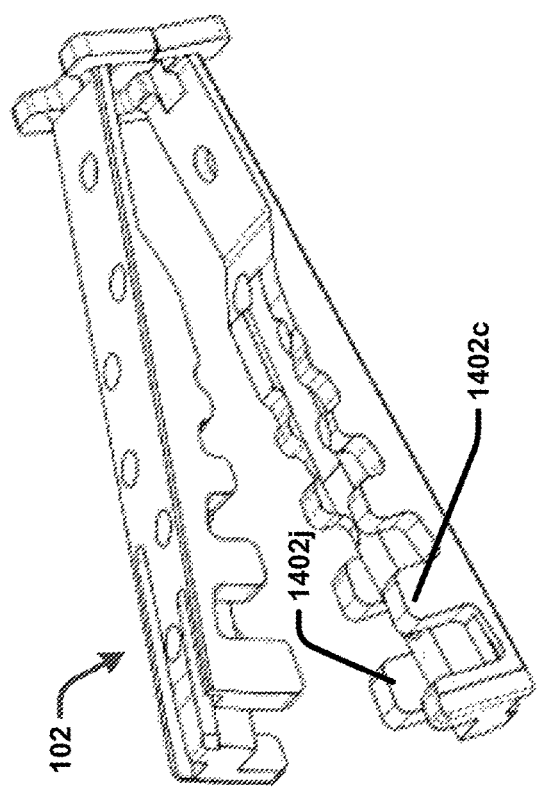

Further, as illustrated in FIG. 14C, illustrating the example first piece 102 in an expanded disposition, the interlacing height expansion teeth 1402 can also have offset teeth on the opposing sides, on the left side and right side, which can provide increased strength to the device. That is, for example, tooth 1402c on a first side is offset from tooth 1402j on a second, opposing side.

Further, the central ridge 1122 of the third piece 106 creates a pair of channels or ledges 1404 on either side of the central ridge 1122. Additionally, the central ridge 1122 is disposed on both the upper and lower surfaces 1106, 1108 of the third piece 106, which results in pairs of ledges 1404 on both the upper and lower surfaces 1106, 1108. In this implementation, when the third piece 106 is inserted into the second piece 104, through a proximal opening 1406, the respective height expansion teeth 1402 are configured to interface with the respective ledges 1404 to separate the top side 1006 and bottom side 1008 of the second piece 104, thereby expanding the second piece 104. As illustrated, amount of height expansion is enhanced due to interlacing height expansion teeth 1402. As one example, if the height of the unexpanded second piece 104 is 5 mm tall, and the outer height of the third piece 106 is 3 mm tall, then a height after insertion of third piece 106 can be: 5+3+5=13 mm, due to the interlacing height expansion teeth 1402.

Figure 14D:
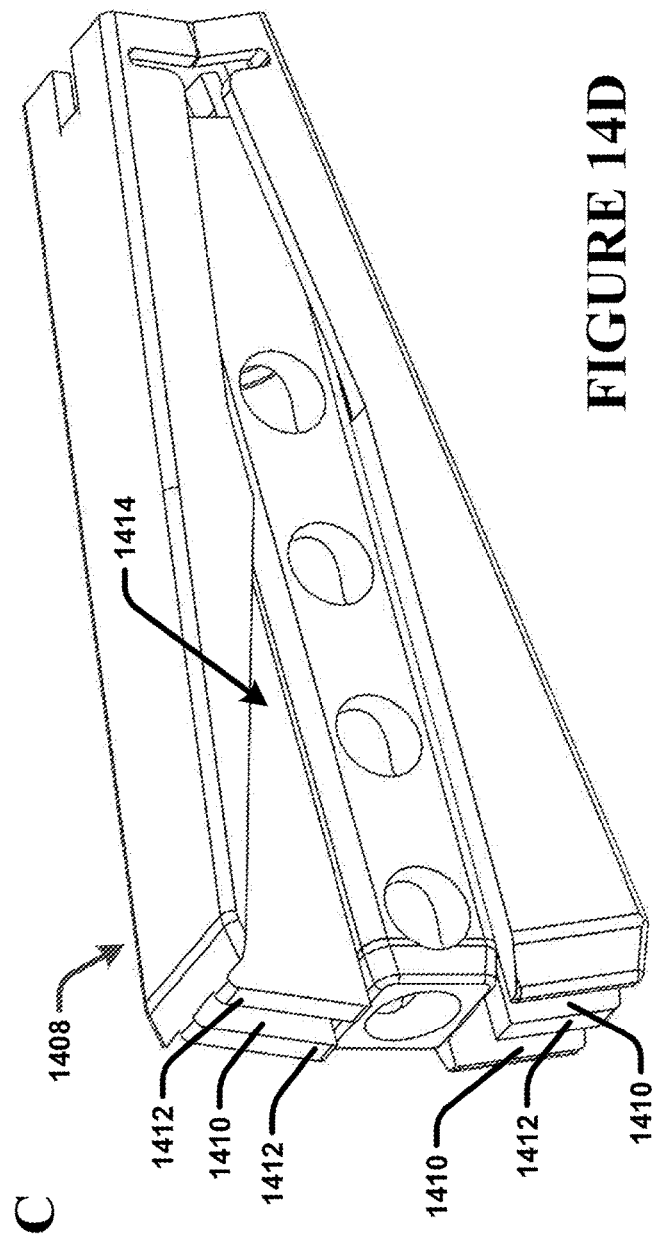

FIG. 14D illustrates an alternate design for the second piece 1408. In this implementation, a set of interlacing slots 1410 and complementary ridges 1412 are disposed in an internal cavity 1414 of the second piece 1408. In this way, as illustrated, when a third piece 1416 is inserted into the internal cavity 1414 the respective ridges 1412 are displaced from their slots 1410 to create a height expansion. These figures and designs are for illustrative purposes. It is anticipated that other alternate designs may be configured to achieve similar results.

FIGS. 15A and 15B illustrate the slit groove features of the first piece 402 (e.g., or 102) that allows for appropriate expansion and containment of the respective piece of the exemplary device 400 (e.g., or 100). In this example, the first piece 402 comprises a first set of alternating, split groove teeth 1502, disposed in the top and bottom sides 516, 518 (e.g., or 316, 318). The first set of split groove teeth 1502 are spaced in an alternating pattern from either vertical side 512, 514 (e.g., or 312, 314) toward the other side of the first piece 402. As illustrated in FIG. 15A, the design and pattern of the first set of split groove teeth 1502 can increase contact between first piece 402 and the second piece 104, especially towards the distal end. For example, without this design, the first piece 402 may hang on the edges of the second piece 104, and could potentially slip off. The design is for illustrative purposes, and other design and patterns are anticipated.

As illustrated in FIG. 15B, in some implementations, first piece 402 comprises a second set of alternating, split groove teeth 1504, disposed in the first and second sides 512, 514. The second set of split groove teeth 1504 are spaced in an alternating pattern from either the top or bottom side 516, 518 toward the other side of the first piece 402. The design and pattern of the second set of split groove teeth 1504 can create a stronger enclosure for the both the second piece 104 and the third piece 106. As an example, without this design and pattern the second piece 104 and the third piece 106 could potentially slide sideways out of the first piece 402. The design is for illustrative purposes, and other design and patterns are anticipated.

FIG. 16A shows a side view (either side) of a first piece 402 (e.g., or 102), of an exemplary device (e.g., 100); and FIG. 16B show a top view (or bottom view) of the first piece 402 of the exemplary device. In this implementation, the top surface 516 and bottom surface 518 can comprise a series of toothed ridges 1602 and tooth valleys 1604. In this implementation, the teeth pattern of the toothed ridges 1602 and tooth valleys 1604 comprises a steep anterior angle (toward the distal end 508), and a sloped posterior angle (toward the proximal end). As an example, the steep anterior angle can mitigate anterior migration of the device after installation. Further, for example, posterior migration is less relevant, as the expanded "wedge" shape, after height expansion, can mitigate posterior migration. Additionally, as an example, the sloped posterior angle may allow for easier removal of the device, if necessary. In this implementation, the teeth pattern has a radius (e.g., is circular) around the width expansion movement of the device. This radial design of the teeth pattern can mitigate resistance during the width expansion, as the top and bottom plates slide/move/scrape along the vertebral endplates.

Figure 17:
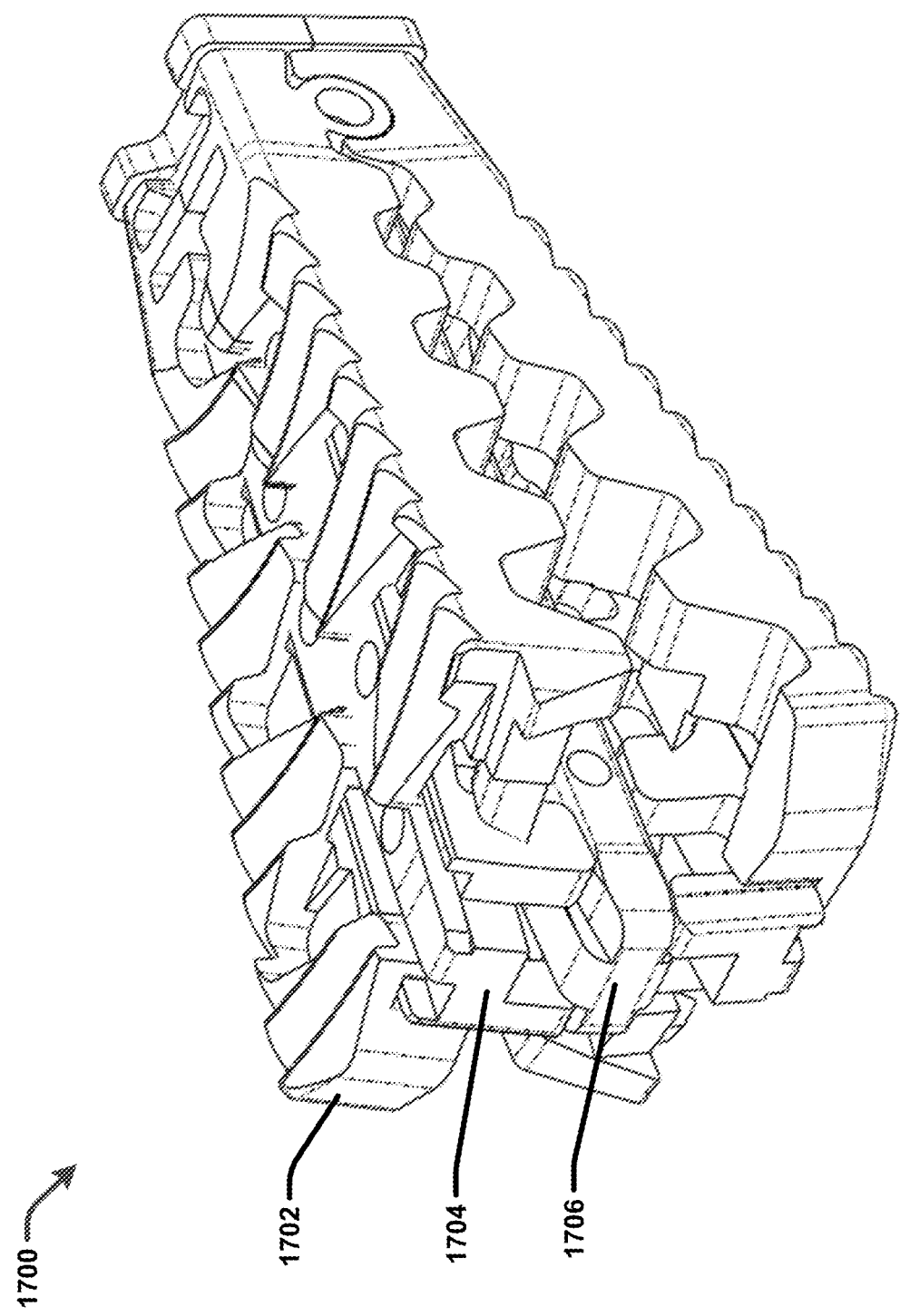
FIG. 17 is a component diagram illustrating an example implementation of one or more portions of one or more devices described herein.

FIG. 17 illustrates an alternate implementation of an exemplary expansion cage device 1700 used for spinal procedures. The exemplary expansion cage device 1700 comprises a first piece 1702, which is an expansion cage structure that can be inserted into an intervertebral space, for example, for a spinal fusion procedure. The exemplary expansion cage device 1700 comprises a second piece 1704 (a.k.a., width expander) that can be inserted into the first piece 1702, resulting in a width expansion of the first piece 1702. The exemplary expansion cage device 1700 comprises a third piece (a.k.a., height expander) that can be inserted into the second piece 1704, resulting in a height expansion of the second piece 1704 and the first piece 1702. Further, in this implementation, the exemplary device 1700 comprises the addition of grooves/bosses to mitigate the first piece 1702 from sliding off of the edges of the second piece 1704. Further, the first piece 1702 comprises modified engagements between the respective pieces 1702, 1704, 1706 to provide a smoother transition, as described below.

Figure 18:
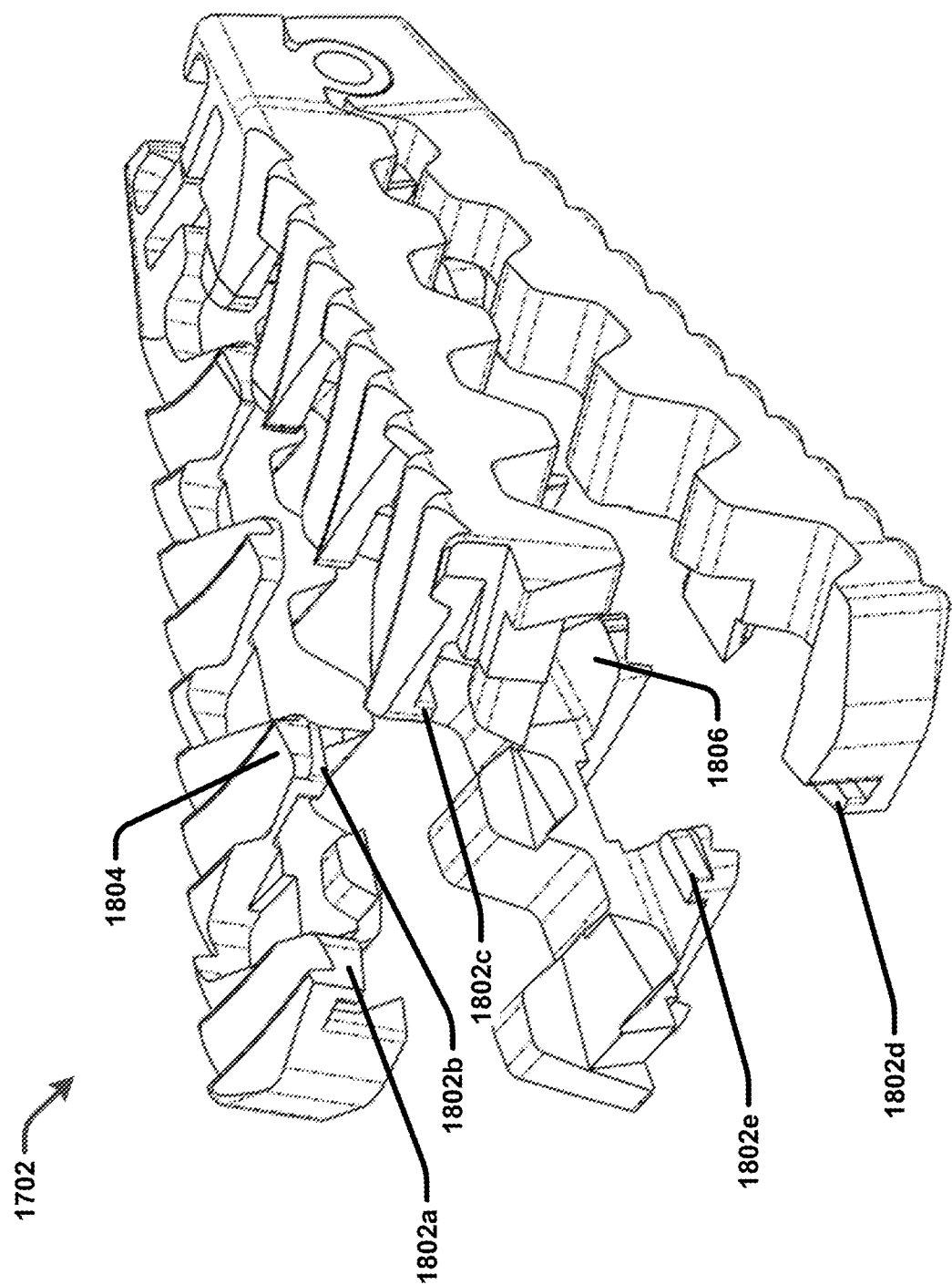
FIG. 18 is a component diagram illustrating an example implementation of one or more portions of one or more devices described herein.

FIG. 18 illustrates an example implementation of the first piece 1702. In this implementation, bosses 1802 (a thru e) are disposed on the tip of one or more of the top and bottom split groove teeth 1804, 1806. The bosses 1802 project inward from the top and bottom split groove teeth 1804, 1806. As illustrated, there are five visible bosses 1802 (*a-e*), however, more or less bosses may be implemented to accommodate alternate designs. Further, the respective bosses 1802 may comprise different sizes (e.g., lengths) and shapes to appropriately accommodate the coupling with the second piece accordingly.

Figure 19:
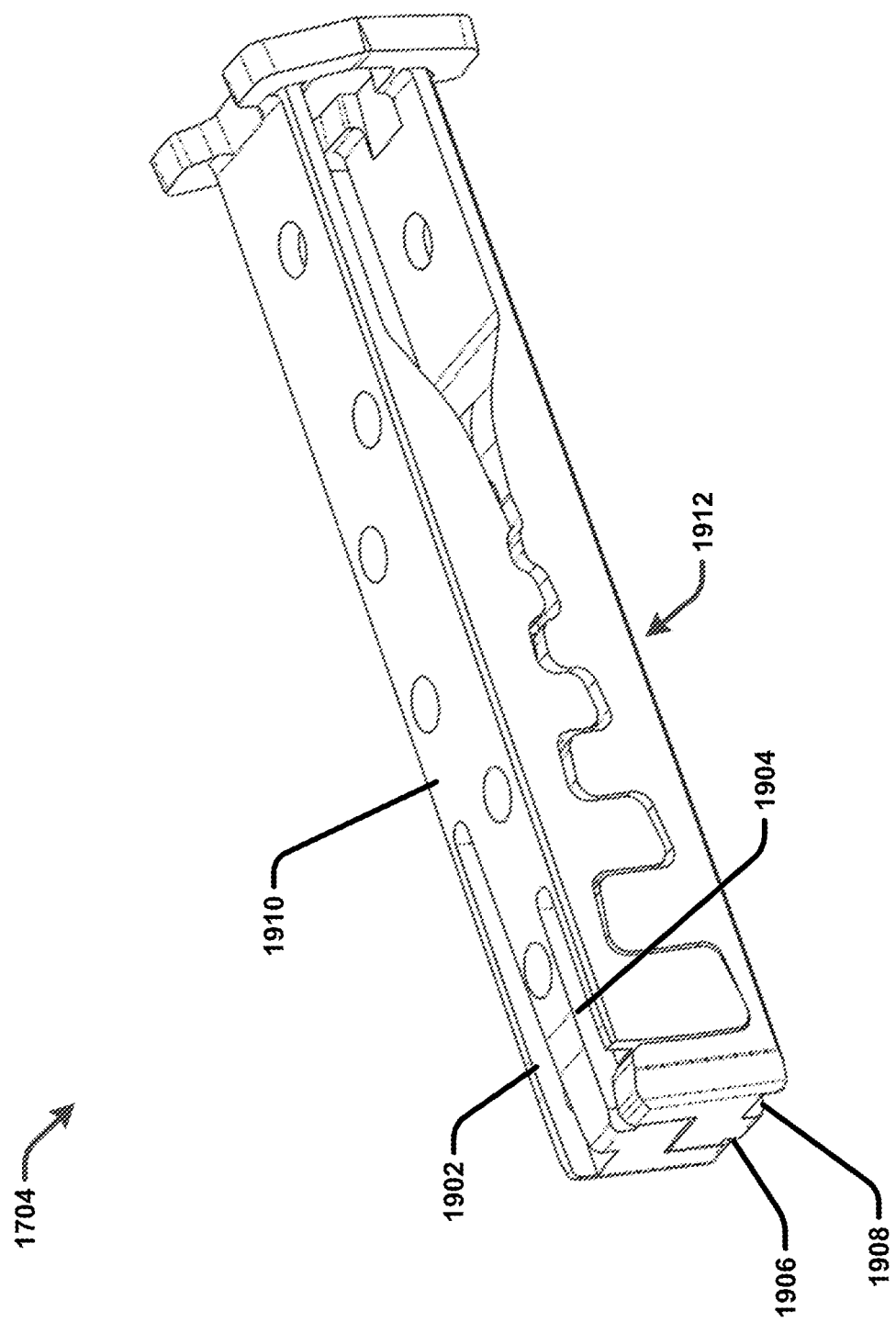
FIG. 19 is a component diagram illustrating an example implementation of one or more portions of one or more devices described herein.

FIG. 19 illustrates the example implementation of the second piece 1704. In this implementation, the second piece 1704 comprises a first top groove 1902 and a second top groove 1904, disposed on the top surface 1910 on opposite sides; and first bottom groove 1906 and a second bottom groove 1908, disposed on the bottom surface 1912 on opposite sides. In this implementation, the respective grooves 1902, 1904, 1906, 1908 are configured to operably receive the bosses 1802*a*, 1802*b*, 1802*c*, 1802*d*, and 1802*e*. For example, when the second piece 1704 is inserted into the first piece 1702, bosses 1802*a* and 1802*b* will interface with groove 1902; boss 1802*c* will interface with groove 1904; boss 1802*e* will interface with groove 1906; and boss 1802*d* will interface with groove 1908. In this illustration, additional bosses may be present, but are not visible for ease of explanation.

Figure 20:
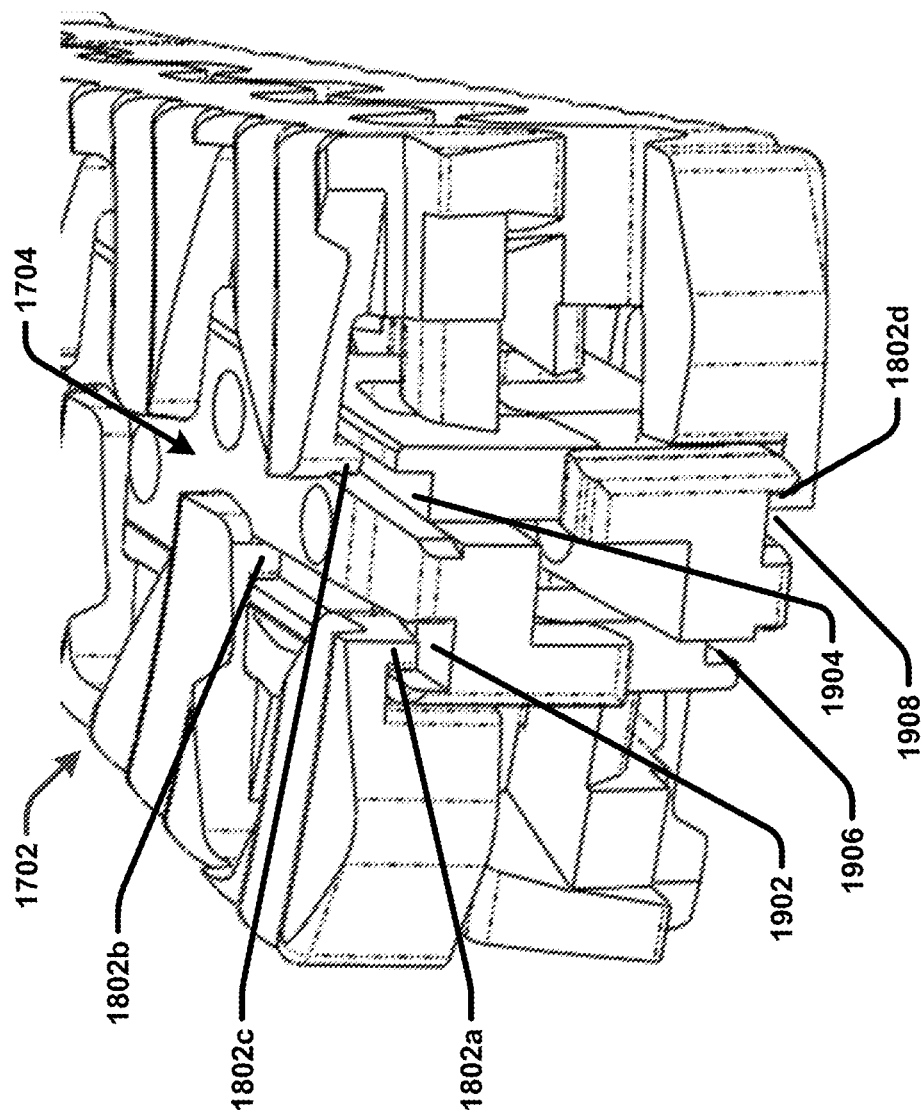
FIG. 20 is a component diagram illustrating an example implementation of one or more portions of one or more devices described herein.

As an illustrative example, FIG. 20 shows the interaction of the respective bosses 1802 with their complementary channels 1902, 1904, 1906, 1908. As illustrated, when the second piece 1704 is inserted into the first piece 1702 bosses 1802*a*, 1802*b* align in the groove 1902. Further, boss 1802*c* aligns in groove 1904, and boss 1802*d* aligns in groove 1908. Additionally, the other bosses appropriately align in their complementary grooves. For example, the "boss-in-groove" design feature can mitigate the potential of the first piece sliding off of the second piece, as the bosses 1802 of the first piece 1702 are interfaced (e.g., locked into) with the grooves 1902, 1904, 1906, 1908 of the second piece 1704.

Figure 21C:
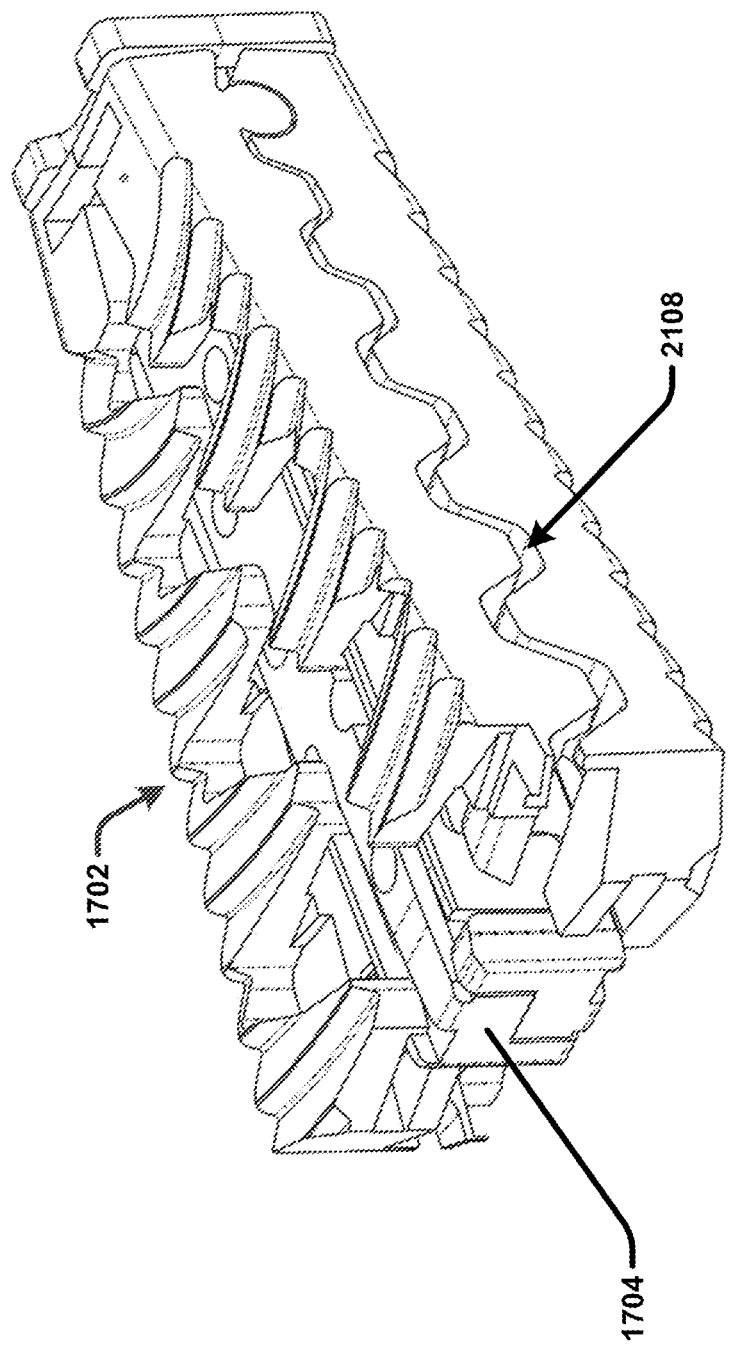

In some implementations, the second piece 1704 may also be able to cause a small amount of height expansion. As illustrated in FIGS. 21A, 21B, and 21C, an alternate first piece 1702, the internal faces 2102 (a thru f) of the inside bottom 2104 and top 2106 surface of the first piece 1702 can be angled. In this example, the angling of the respective internal faces 2102 can create a slight height expansion 2108 when the second piece 1704 is inserted into the first piece 1702.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An expanding spinal cage device, comprising;
a first piece comprising a cage support body;
a second piece unconnected to the first piece prior to insertion, the second piece comprising a width expander body configured and sized for insertion from an area outside of the first piece and into an interior cavity of the first piece resulting in lateral expansion of the first piece from a first width to a second width; and
a third piece unconnected to the first piece and the second piece prior to insertion, the third piece comprising a vertical expander body configured and sized for insertion from an area outside of the first piece or the second piece and into the first or second piece resulting in vertical expansion of the first piece from a first height to a second height;
wherein the second width is greater than the first width;
wherein the second height is greater than the first height;
wherein the first piece comprises a distal end and proximal end, the distal end configured for insertion into an intervertebral space in an unexpanded disposition; and
wherein the second piece comprises a distal end and proximal end, the distal end of the second piece configured for operable insertion into the proximal end of the first piece; and the second piece comprising a top section and separable bottom section coupled together at the proximal end thereof in a hinged arrangement.

2. The expanding spinal cage of claim 1, the third piece comprising a distal end and proximal end, the distal end of the third piece configured for operable insertion into the proximal end of the second piece.

3. The expanding spinal cage of claim 1, the first piece comprising vertically disposed interlocking teeth along respective first and second vertical sides, the vertically disposed interlocking teeth operably expanding apart vertically.

4. The expanding spinal cage of claim 3, the first vertical side comprising teeth in a first vertical arrangement, the second vertical side comprising teeth in a second vertical arrangement, the first vertical arrangement teeth longitudinally offset from the second vertical arrangement teeth.

5. The expanding spinal cage of claim 1, the first piece comprising horizontally disposed interlocking teeth along respective first and second horizontal sides, the horizontally disposed interlocking teeth operably expanding apart horizontally.

6. The expanding spinal cage of claim 5, the first horizontal side comprising teeth in a first horizontal arrangement, the second horizontal side comprising teeth in a second horizontal arrangement, the first horizontal arrangement teeth offset longitudinally from the second horizontal arrangement teeth.

7. The expanding spinal cage of claim 5, the horizontally disposed interlocking teeth of the first horizontal side comprising top teeth disposed merely at a distal portion of the first horizontal side of the first piece.

8. The expanding spinal cage of claim 7, the respective top teeth increasing in length toward the distal end, and comprising an angled interior face configured to engage a side wall of the second piece to facilitate width expansion of the first piece.

9. The expanding spinal cage of claim 5, the horizontally disposed interlocking teeth of the first horizontal side comprising bottom teeth from a proximal end to a distal end of the first horizontal side of the first piece.

10. The expanding cage of claim 5, the first piece comprising a boss extending substantially orthogonally from one or more of the horizontally disposed interlocking teeth.

11. The expanding cage of claim 10, the second piece comprising a groove extending longitudinally along a surface of the second piece, the groove complementary to the boss.

12. The expanding spinal cage of claim 1, the first piece comprising two separate pieces operably, selectably coupled together.

13. The expanding spinal cage of claim 12, the respective pieces comprising identical pieces.

14. The expanding spinal cage of claim 1, the first piece comprising a plurality of ridges disposed on an upper and lower surface, the ridges configured to mitigate movement of the first piece in a direction away from a point of insertion.

15. The expanding spinal cage of claim 1, wherein the second width is 1.5 to 2.7 times greater than the first width, and the second height is 1.5 to 2.7 times greater than the first height.

16. The expanding spinal cage of claim 1, wherein the first and second widths and the first and second heights are dimensions of the distal end of the first piece, wherein when the second piece is inserted into the interior cavity of the first piece, the first piece has a third width at the proximal end thereof, wherein the second width is greater than the third width, and wherein when the third piece is inserted into the first piece or the second piece, the first piece has a third height at the proximal end thereof, wherein the second height is greater than the third height.

17. The expanding spinal cage of claim 1, wherein the first piece is expandable from a collapsed position to a laterally expanded position, wherein the first piece comprises a top side and a bottom side, wherein each of the top and bottom sides includes first and second members extending longitudinally in a direction parallel to a longitudinal axis of the interior cavity, wherein the first and second members of each of the top and bottom sides collectively define the interior cavity when the first piece is in the collapsed position, and wherein when the second piece is inserted into the interior cavity, the first piece is expanded from the collapsed position to the laterally expanded position.

18. The expanding spinal cage of claim 1, wherein the distal end of the second piece is insertable into the interior cavity through an opening provided at the proximal end of the first piece, and wherein when the second piece is fully inserted into the first piece, the proximal end of the second piece abuts the proximal end of the first piece.

19. The expanding spinal cage of claim 18, wherein the third piece has proximal and distal ends, wherein the distal end of the third piece is insertable into the proximal end of the second piece, and wherein when the third piece is fully inserted into the second piece, the proximal end of the third piece abuts the proximal end of the second piece.

20. An expanding spinal cage device, comprising:
a first piece operable to expand both vertically and laterally;
a second piece unconnected to the first piece prior to insertion, the second piece comprising a lateral expander body, wherein insertion of the second piece from an area outside of the first piece and into an interior cavity of the first piece results in the lateral expansion of the first piece from a first width to a second width; and
a third piece unconnected to the first piece and the second piece prior to insertion, the third piece comprising a vertical expander body, wherein insertion of the third piece from an area outside of the second piece and into the second piece results in vertical expansion of the first piece from a first height to a second height;
wherein the second width is greater than the first width; and
wherein the second height is greater than the first height.

21. The expanding spinal cage device of claim 20, the first piece comprising two separate, identical pieces operably, selectably coupled together, respective pieces centrally split into two sides hinged together, wherein respective sides comprise teeth that meshedly interlock with the teeth on the other side, and wherein respective pieces comprise teeth that meshedly interlock with the teeth on the other piece.

22. An expanding spinal cage device, comprising:
a first piece comprising two separate, identical pieces operably, selectably coupled together, respective pieces centrally split into two sides hinged together, wherein respective sides comprise teeth that meshedly interlock with the teeth on the other side, wherein respective pieces comprise teeth that meshedly interlock with the teeth on the other piece, and wherein respective pieces comprise top expansion teeth internally each having an angled face;
a second piece unconnected to the first piece prior to insertion, the second piece comprising a lateral expander body with sides that engage the angled face of the top expansion teeth when inserted into an interior cavity of the first piece, from an area outside of the first piece, resulting in the lateral expansion of the first piece from a first width to a second width, the second piece, comprising a top section and bottom section that are hinged at a proximal end, and the second piece comprising intermeshing teeth disposed on the top and bottom sections; and
a third piece unconnected to the first piece and the second piece prior to insertion, the third piece comprising a vertical expander body, wherein insertion of the third piece into the second piece, from an area outside of the second piece, results in the top section separating from the bottom section of the second piece in a hinged expansion, resulting in a vertical expansion of the first piece from a first height to a second height;
wherein the second width is greater than the first width; and
wherein the second height is greater than the first height.

* * * * *